United States Patent
Escribano et al.

(10) Patent No.: US 12,230,807 B2
(45) Date of Patent: Feb. 18, 2025

(54) FUEL CELL LIMITING CO POISONING AND POISONING DIAGNOSTIC PROCESS

(71) Applicant: COMMISSARIAT A L'ENERGIE ATOMIQUE ET AUX ENERGIES ALTERNATIVES, Paris (FR)

(72) Inventors: Sylvie Escribano, Grenoble (FR); Marion Chandesris, Grenoble (FR); Laure Guetaz, Grenoble (FR); Pascal Schott, Grenoble (FR); Marion Scohy, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 18/100,264

(22) Filed: Jan. 23, 2023

(65) Prior Publication Data
US 2023/0238542 A1    Jul. 27, 2023

Related U.S. Application Data

(63) Continuation of application No. 17/058,875, filed as application No. PCT/EP2018/064231 on May 30, 2018, now abandoned.

(51) Int. Cl.
*H01M 4/86* (2006.01)
*H01M 4/92* (2006.01)
*H01M 8/1004* (2016.01)

(52) U.S. Cl.
CPC ....... *H01M 4/8605* (2013.01); *H01M 4/8642* (2013.01); *H01M 4/921* (2013.01); *H01M 4/926* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 2003/0134180 A1* | 7/2003 | Hori | H01M 4/96 429/490 |
| 2007/0077465 A1 | 4/2007 | Matsuoka et al. | |
| 2009/0092888 A1 | 4/2009 | Takahashi et al. | |
| 2010/0055542 A1 | 3/2010 | Matsuoka et al. | |
| 2010/0304240 A1 | 12/2010 | Koike et al. | |

(Continued)

FOREIGN PATENT DOCUMENTS

| | | |
|---|---|---|
| JP | 7-85874 A | 3/1995 |
| JP | 8-167416 A | 6/1996 |

OTHER PUBLICATIONS

International Search Report issued on Jan. 30, 2019 in PCT/EP2018/064231 filed on May 30, 2018, 3 pages.

*Primary Examiner* — Alix E Eggerding
(74) *Attorney, Agent, or Firm* — Oblon, McClelland, Maier & Neustadt, L.L.P.

(57) ABSTRACT

A unit cell of a fuel cell may include: a membrane-electrode assembly including a proton exchange membrane, an anode electrode fastened to a first face of the proton exchange membrane, a first flow guide plate positioned facing the anode electrode and including at least one flow channel having a fuel inlet zone, a median flow zone and a fuel outlet zone. The anode electrode may have, at the fuel outlet zone, a tolerance to carbon monoxide pollution greater than its average tolerance to carbon monoxide pollution at the median flow zone and at the fuel inlet zone.

12 Claims, 9 Drawing Sheets

(56) References Cited

U.S. PATENT DOCUMENTS

2011/0020735 A1\* 1/2011 Paik ..................... H01M 4/92
           429/525
2011/0076593 A1 3/2011 Matsuda et al.

\* cited by examiner

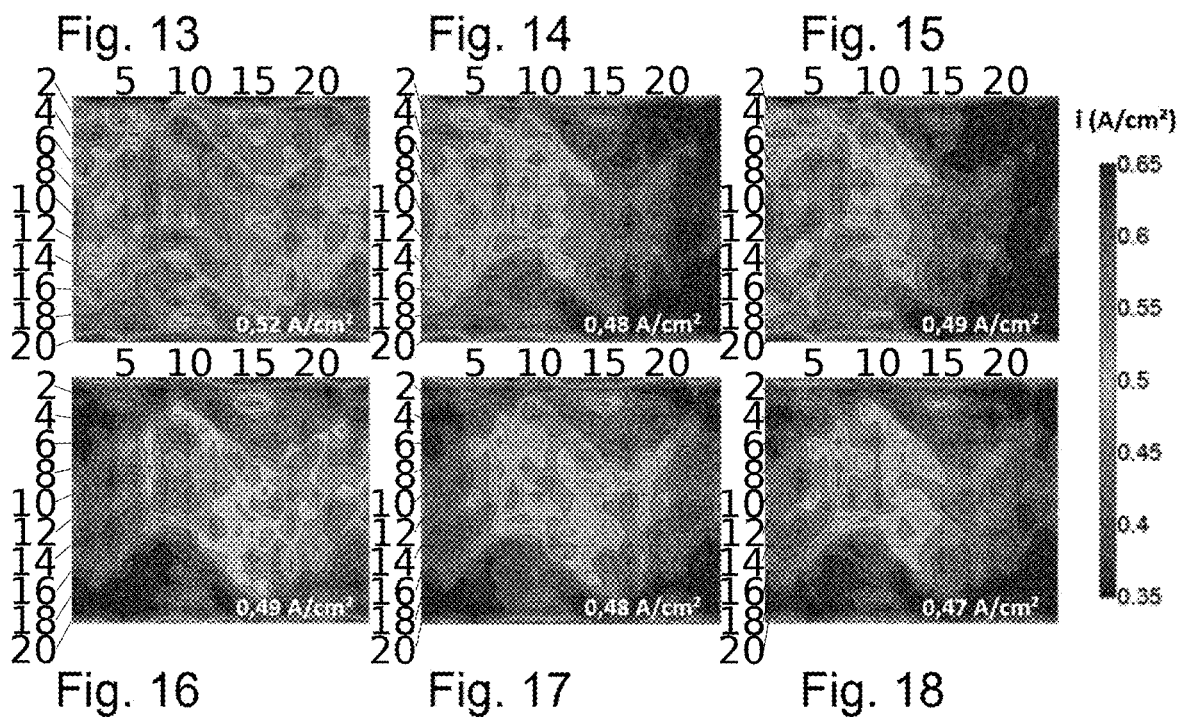
Fig. 13  Fig. 14  Fig. 15
Fig. 16  Fig. 17  Fig. 18
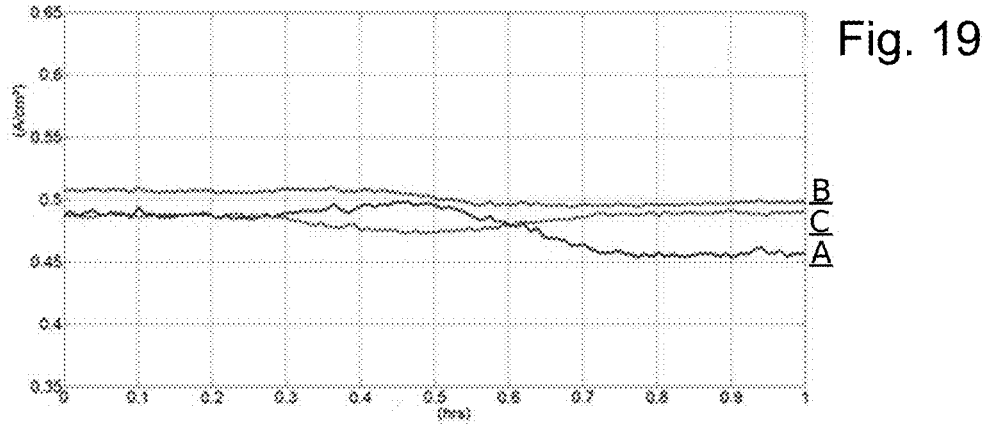
Fig. 19
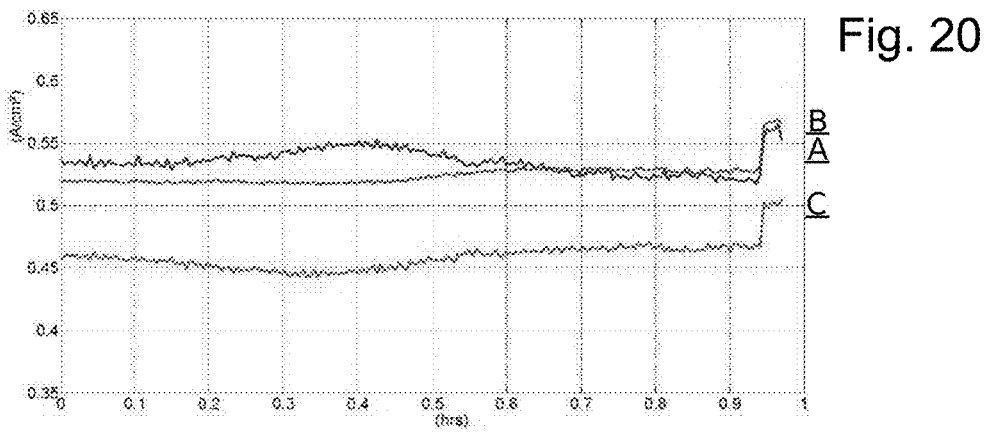
Fig. 20

FUEL CELL LIMITING CO POISONING AND POISONING DIAGNOSTIC PROCESS

CROSS-REFERENCE TO RELATED APPLICATIONS

This application is a continuation of U.S. application Ser. No. 17/058,875, filed Nov. 25, 2020, which is a National Stage Application of PCT/EP2018/064231, filed May 30, 2018; the entire contents of which are incorporated herein by reference.

The invention relates to proton exchange membrane fuel cells, and in particular to such fuel cells that are optimized for the use of dihydrogen obtained through reformation of fossil products.

Fuel cells are for example being contemplated as an electric power supply system for motor vehicles produced on a large scale in the future, as well as for a large number of applications. A fuel cell is an electrochemical device that converts chemical energy directly into electrical energy. A fuel such as dihydrogen or methanol is used as fuel for the fuel cell.

Since dihydrogen is not available in the natural state, an efficient dihydrogen production method is essential to allow the growth of the fuel cell industry. The manufacture of dihydrogen used as fuel for fuel cells is based either on the electrolysis of water or on a chemical reaction implemented with hydrocarbons. The main disadvantage of producing dihydrogen through electrolysis of water is that it requires a large amount of energy.

In addition to a smaller required amount of energy, the production of dihydrogen from hydrocarbons has the advantage of being able to control the emission of carbon dioxide in order to avoid its release into the atmosphere and thus to avoid the associated greenhouse effect.

The production of dihydrogen may for example use hydrocarbons such as natural gas. The steam reforming of natural gas or of liquid petroleum gas may for example be implemented at a temperature of between 700 and 1100° C., with a pressure of between 20 and 30 bar. Water vapor reacts notably with methane on a catalyst. A mixture of carbon monoxide and dihydrogen is then obtained according to the following reaction:

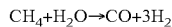

$CH_4 + H_2O \rightarrow CO + 3H_2$

$4H^+ + 4e^- + O_2 \rightarrow 2H_2O$ at the cathode.

Additional dihydrogen may still be recovered through water addition and through water reduction carried out at around 130° C., with a view to also oxidizing the carbon monoxide to carbon dioxide.

It is contemplated to develop the use of fuel cells in the stationary field. Preference is then given to proton exchange membrane fuel cells due to their low operating temperature, due to their high power density and due to their excellent dynamic response. Despite the progress that has been made, the service life of such fuel cells is still insufficient to allow them to be deployed on a large scale in the stationary field. It is notably estimated that a service life of 40 000 hours is necessary to contemplate them being deployed.

In this context of a need to increase the service life of fuel cells, the use of dihydrogen obtained through reformation is still proving problematic. Specifically, the fuel thus obtained comprises traces of carbon monoxide, in a much larger proportion than for a fuel obtained through electrolysis of water. Carbon monoxide is particularly harmful to the anode, due to its adsorption on platinum. The adsorption of CO at the anode degrades the dihydrogen oxidation reaction, through a phenomenon known as CO poisoning.

Among the solutions contemplated for reducing the amount of carbon monoxide and therefore the poisoning of the anode, one known method introduces air at the anode, in order to promote the oxidation of the carbon monoxide to carbon dioxide. However, such a method tends to degrade the membrane/electrode assembly, thereby reducing the service life thereof.

Although carbon monoxide poisoning of the anode is reversible in theory, it also affects the service life of the fuel cell. Specifically, the poisoning of the anode induces a redistribution of the local current densities in the fuel cell, thereby affecting both the potential of the anode and the potential of the cathode. This may induce degradation of the active anode and cathode layers by affecting their catalysts.

Moreover, it is known to analyze the degradation heterogeneities of membrane/electrode assemblies after dismantling the fuel cell, called post-mortem analyses. The drawback of such analyses is that they allow results to be obtained only after complete dismantling of the fuel cell and after destruction of the membrane/electrode assembly.

The invention aims to rectify one or more of these drawbacks. The invention thus relates to a cell for a fuel cell, comprising:
- a membrane-electrode assembly, including:
  - a proton exchange membrane; and
  - an anode electrode fixed to a first face of the proton exchange membrane:
- a first flow guide plate arranged opposite the anode electrode and comprising at least one flow channel having a fuel inlet zone, a middle flow zone and a fuel outlet zone.

At said fuel outlet zone, said anode electrode has a carbon monoxide pollution tolerance greater than its average carbon monoxide pollution tolerance at the middle flow zone and at the fuel inlet zone.

The invention also relates to the following variants. A person skilled in the art will understand that each of the features of the following variants may be combined independently with the above features, without otherwise constituting an intermediate generalization.

According to one variant, the membrane-electrode assembly includes a cathode electrode fixed to a second face of the proton exchange membrane;
  comprising a second flow guide plate arranged opposite the cathode electrode and comprising at least one flow channel.

According to yet another variant, the cathode electrode has a zone having a catalyst loading greater than its average catalyst loading outside this zone.

According to another variant, said flow channel has an oxidizer inlet zone, a middle flow zone and an oxidizer outlet zone, said zone of the cathode electrode having a greater catalyst loading being positioned at the oxidizer outlet zone.

According to yet another variant, the oxidizer outlet zone of the cathode electrode is positioned vertically to the fuel inlet zone.

According to one variant, the oxidizer inlet zone of the cathode electrode is positioned vertically to the fuel outlet zone, and the oxidizer inlet zone of the cathode electrode has a catalyst loading lower than its average catalyst loading outside this zone.

According to another variant, said flow channel has an oxidizer inlet zone, a middle flow zone and an oxidizer outlet zone, and said cathode electrode includes a catalyst of PtX alloy type, where X is a metal, the proportion of the metal X, in said oxidizer outlet zone, being lower than the average proportion of the metal X of the cathode catalyst outside this zone.

According to yet another variant, said proportion of the metal X in said oxidizer outlet zone is at least two times lower than the average proportion of the metal X of the cathode catalyst outside this zone.

According to yet another variant, said metal X is cobalt.

According to one variant, said anode electrode has, at said fuel outlet zone, a carbon monoxide tolerance at least 30% greater than its average carbon monoxide tolerance at the middle flow zone and at the fuel inlet zone.

According to yet another variant, said anode electrode includes PtRu at its outlet zone.

According to another variant, said anode electrode has, at its outlet zone, a catalyst loading greater than its average loading outside this zone.

According to yet another variant, said anode electrode has, at its outlet zone, a catalyst loading at least 30% greater than its average loading outside this zone.

The invention also relates to a membrane-electrode assembly, for the implementation of a fuel cell as defined above, comprising:
    a proton exchange membrane; and
    an anode electrode fixed to a first face of the proton exchange membrane, said anode electrode having, at a zone intended to be arranged at a fuel outlet, a carbon monoxide pollution tolerance greater than its average carbon monoxide pollution tolerance at a zone intended to be arranged at a middle flow zone and at a zone intended to be arranged at a fuel inlet.

The invention also relates to a method for simulating the ageing of a membrane/electrode assembly of a cell for a fuel cell as defined above, comprising:
    providing a two-dimensional model of the fuel cell, a first dimension corresponding to the flow direction of a reagent, the second dimension corresponding to the thickness of the cell for the fuel cell, the cathode flow being modeled by a single flow channel, the anode flow being modeled by a single flow channel, said two-dimensional model being configured so as to determine anode poisoning on the basis of the amount of carbon monoxide in the fuel; and
    using the two-dimensional model by applying to it a flow of fuel including carbon monoxide, so as to determine the poisoning of the anode by carbon monoxide on the basis of the position in the first dimension.

Other features and advantages of the invention will become clearly apparent from the description thereof given hereinafter, by way of indication and without any limitation, with reference to the appended drawings, in which:

FIGS. 13 to 18 illustrate maps of current distribution in a cell according to the prior art, as a function of the ageing and the type of fuel that is used;

FIGS. 19 to 21 are graphs of average current densities during diagnostics carried out at various levels of ageing of a cell according to the prior art;

Figure 1:
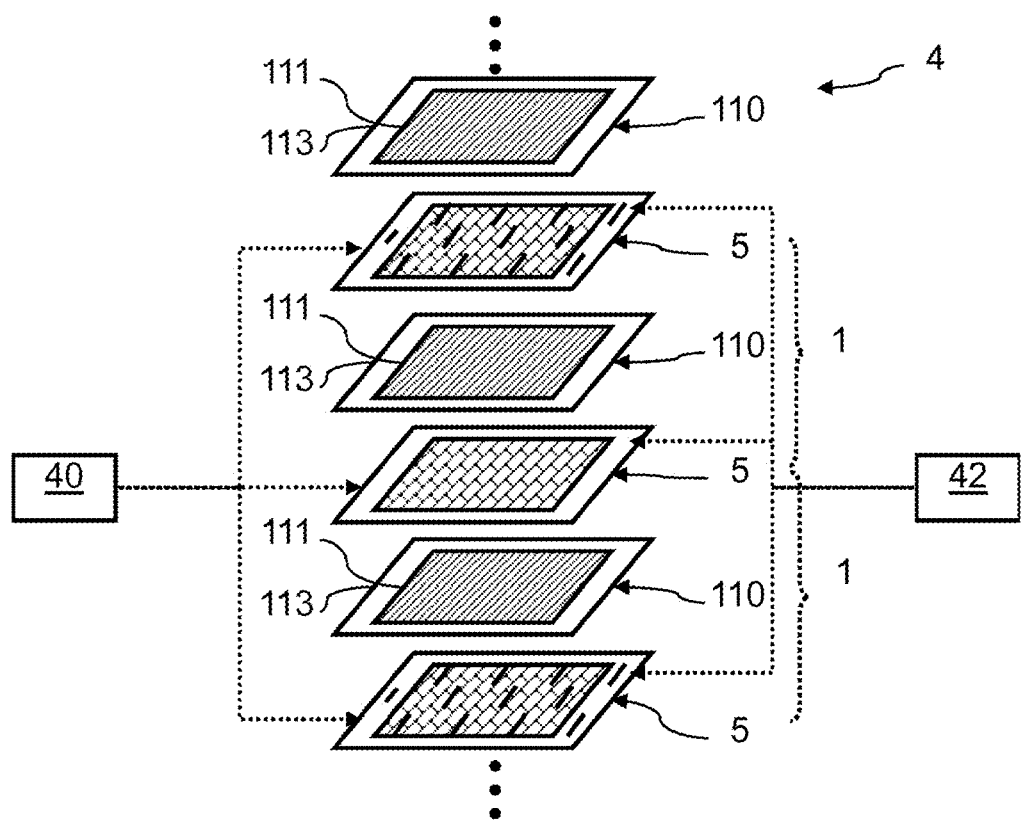
FIG. 1 is an exploded perspective view of one example of a stack of membrane/electrode assemblies and of bipolar plates for a fuel cell.

FIG. 1 is a schematic exploded perspective view of a stack of cells 1 of a fuel cell 4. The fuel cell 4 comprises a plurality of superimposed cells 1. The cells 1 are proton exchange membrane cells or polymer electrolyte membrane cells.

The fuel cell 4 comprises a fuel source 40. The fuel source 40 in this case supplies dihydrogen to an input of each cell 1. The fuel cell 4 also comprises an oxidizer source 42. The oxidizer source 42 in this case supplies air to an inlet of each cell 1, oxygen in the air being used as oxidizer. Each cell 1 also comprises discharge channels. One or more cells 1 also have a cooling circuit.

Each cell 1 comprises a membrane/electrode assembly 110 or MEA 110. A membrane/electrode assembly 110 comprises a solid electrolyte 113, a cathode (not illustrated) intended to receive the oxidizer and an anode 111 intended to receive the fuel, these being placed on either side of the electrolyte and fixed to this electrolyte 113. The electrolyte layer 113 forms a semi-permeable membrane allowing proton conduction while at the same time being impermeable to the gases present in the cell. The electrolyte layer also prevents electrons from flowing between the anode 111 and the cathode.

A bipolar plate 5 is arranged between each pair of adjacent MEAs. Each bipolar plate 5 defines anode flow channels and cathode flow channels on opposing outer faces. Bipolar plates 5 advantageously also define coolant flow channels between two successive membrane/electrode assemblies. The bipolar plates 5 may each be formed in a manner known per se from two assembled conductive metal sheets, for example made from stainless steel, or from a titanium alloy, from an aluminum alloy, from a nickel alloy or from a tantalum alloy. Each sheet then defines a respective outer face. The bipolar plates 5 may also be obtained using any other method, for example molding or injection based on carbon-polymer composites. The bipolar plates 5 may thus also be formed in one piece. The outer faces of the bipolar plate 5 are then defined by such a one-piece component.

The stack may also comprise peripheral seals and membrane supports, not illustrated here. Each cell 1 may furthermore comprise a gas diffusion layer (not illustrated) arranged between the anode and a bipolar plate, and another gas diffusion layer arranged between the cathode and another bipolar plate.

In a manner known per se, during the operation of the fuel cell 4, air flows between an MEA and a bipolar plate, and dihydrogen flows between this MEA and another bipolar plate. At the anode, the dihydrogen is oxidized to produce protons that flow through the MEA. The electrons produced by this reaction are collected by a bipolar plate 5. The electrons that are produced are then applied to an electrical load connected to the fuel cell 4 to form an electric current. At the cathode, oxygen is reduced and reacts with protons to form water. The reactions at the anode and at the cathode are governed as follows:

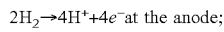

$$2H_2 \rightarrow 4H^+ + 4e^- \text{ at the anode;}$$

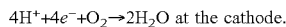

$$4H^+ + 4e^- + O_2 \rightarrow 2H_2O \text{ at the cathode.}$$

During its operation, a cell 1 of the fuel cell 4 usually generates a DC voltage between the anode and the cathode of the order of 1 V.

The oxidizer source 42 typically comprises a compressor for introducing air at a given pressure at the inlet of the cells 1. Such a compressor receives for example an air pressure setpoint, the air pressure being able to be regulated through a variable rotational speed of the compressor.

The stack of bipolar plates 5 and membrane/electrode assemblies 110 is intended to form a plurality of flow manifolds. To this end, respective orifices (591 to 596, illustrated in FIG. 2) are formed through the bipolar plates 5 and through the membrane/electrode assemblies 110. The orifices in the bipolar plates 5 and in the membrane/electrode assemblies 110 are arranged opposite one another in order to form the various flow manifolds.

Figure 2:
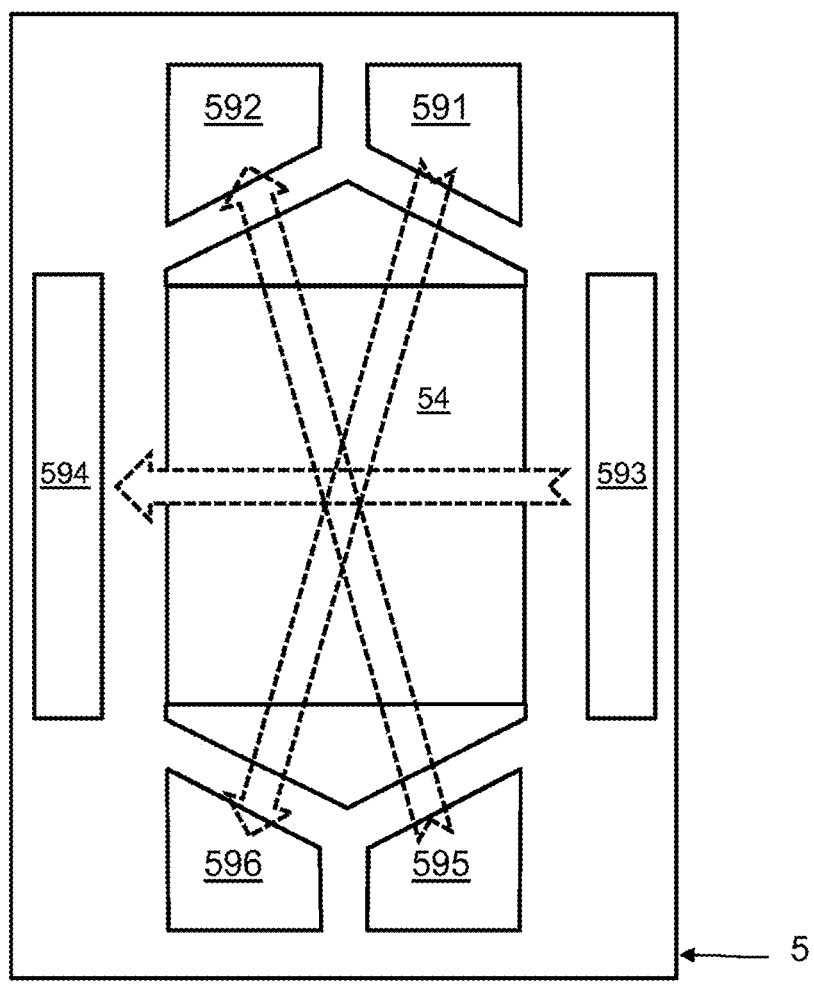
FIG. 2 is a plan view of one example of a bipolar plate for a fuel cell having a cooling circuit with a flow transverse with respect to the fuel and oxidizer.

FIG. 2 is a schematic plan view of a bipolar plate 5 given by way of example, other flow channel configurations being able to be contemplated. The bipolar plates 5 thus comprise orifices 591 and 592 at a first longitudinal end, orifices 595 and 596 at a second longitudinal end, an orifice 593 at a first lateral end, and an orifice 594 at a second lateral end.

The orifice 591 is used for example to form a fuel supply manifold, and the orifice 596 is used for example to form a reaction residue and unused fuel discharge manifold. The orifice 593 is used for example to form a coolant supply manifold, and the orifice 594 is used for example to form a coolant discharge manifold. The orifice 595 is used for example to form an oxidizer supply manifold, and the orifice 592 is used for example to form a produced water and unused oxidizer discharge manifold.

The outer face illustrated for the bipolar plate 5 comprises ribs defining flow channels for a reagent, for example fuel. The zone comprising the flow channels corresponds to the active zone 54 of the electrochemical cell. The flow channels are intended here to put the manifolds 592 and 595 in communication. An inlet homogenization zone may connect the manifold 595 to the inlet of the flow channels of the active zone 54. A discharge homogenization zone may connect the manifold 592 to the outlet of the flow channels of the active zone 54.

The bipolar plate 5 here comprises a cooling circuit with a flow transverse with respect to the flows of fuel and oxidizer. The flows of fuel and oxidizer here are substantially parallel and in opposing directions. Other configurations may of course be contemplated within the context of the invention.

Presentation of the Degradation Analysis Method

A method for analyzing the degradation of the membrane/electrode assembly makes it possible to better understand the impact of operation, with reformed dihydrogen including carbon monoxide, on the performance losses of the fuel cell. The analysis method focuses on the localization of all degradation phenomena and on the correlation between the drop in performance of membrane/electrode assemblies and the degradation of the functional properties of the electrode and of the microstructure.

To this end, an ageing test at constant load on a stack was implemented using reformed gas, with normal operating conditions for stationary applications.

The evolution of the local current density during ageing was studied in service, using a segmented measuring plate.

Specific tools were developed and used, in particular a carbon monoxide poisoning diagnostic system for estimating the local tolerance of the membrane/electrode assemblies to carbon monoxide and its modification during ageing.

In parallel, what is called a transient dimensional model of the fuel cell was used, which takes carbon monoxide poisoning into account. This model was developed in order to simulate local potentials both at the anode and at the cathode for a better interpretation of the local conditions specific to operation with reformed fuel for the fuel cells.

Post-mortem analyses were then implemented in order to study the local mechanisms that actually take place through measurements of local electrochemical properties and observations on the microstructure.

Based on the conclusions from the experimental studies and through coupled simulations, optimized membrane/electrode assembly designs were designed and tested at the stack level, which made it possible to demonstrate a marked improvement in service life.

Experimentation and Simulation Tools:

Test Bench and Fuel Cell Stack

The test bench that is used is designed to allow precise control of the operating conditions. The bench that is implemented has three gas lines on the fuel side so as to simulate a flow of reformed hydrogen selectively including hydrogen, carbon dioxide, carbon monoxide, methane and air (in order to introduce air). The studies were implemented on a stack of 8 cells having an active surface area of 220 cm².

Each cell includes a membrane/electrode assembly and a metal bipolar plate. The membrane/electrode assemblies include a membrane with a thickness of 20 μm made from ionomer marketed under the trade name Nafion. The catalyst loadings are:

0.52 mg/cm² with a weight distribution of PtRu/C of 50/50 at the anode (marketed under the trade name TEC66V50); and 0.4 mg/cm² with a weight distribution of $Pt_3Co/C$ of 52/48 at the cathode (marketed under the trade name TEC36V52).

Figure 3:
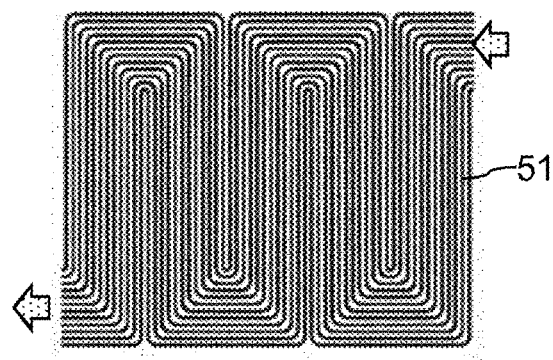
FIG. 3 illustrates one example of a configuration of anode flow channels.
Figure 4:
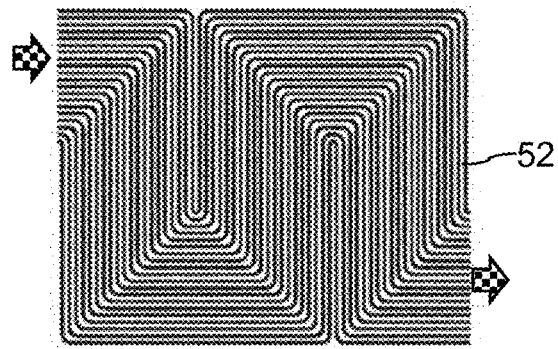
FIG. 4 illustrates one example of a configuration of cathode flow channels.
Figure 5:
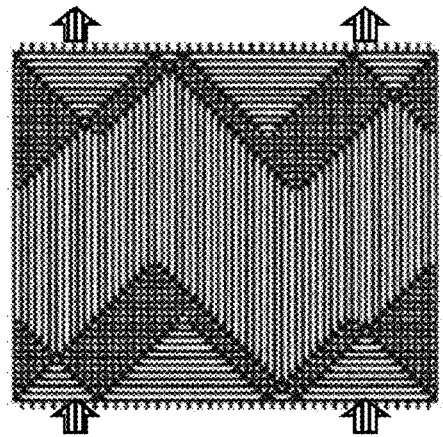
FIG. 5 illustrates one example of a flow of coolant and a superposition of the anode and cathode flows.

Gas diffusion layers with the reference SGL 24 BC were used on both faces. Bipolar plates designed by the applicant were used and include two sheets of stamped stainless steel welded to multi-coil flow channels. There are five anode flow channels between the fuel inlet and the fuel outlet. There are three cathode flow channels between the oxidizer inlet and the oxidizer outlet. Mixed zones are thus obtained between flow in opposing directions and in the same direction between the fuel and the oxidizer. The flow of coolant is defined by the assembly of the anode and cathode metal sheets. The configurations of the anode channels, of the cathode channels and their superposition are illustrated schematically in FIGS. 3 to 5, respectively. FIG. 3 notably illustrates the configuration of the anode flow channels, defined by the elevation profile of a sheet 51. FIG. 4 notably illustrates the configuration of the cathode flow channels, defined by the elevation profile of a sheet 52. FIGS. 3 to 5 also make it possible to illustrate, using arrows, the respective flows of fuel, oxidizer and coolant.

Aging Test Protocol:

The ageing test was carried out under conventional operating conditions for stationary applications: an operating temperature of 65° C., fuel and oxidant inlet pressures of 1.2 bar, a stoichiometry of 1.5 for the fuel and 2 for air, and a relative humidity of 85% for the fuel and the oxidizer. A constant current density of 0.5 A/cm$^2$ was applied to the stack. During the ageing test, the fuel used to simulate said reformed hydrogen includes 75.5% hydrogen, 24% carbon dioxide and 10 ppm carbon monoxide, a concentration that is consistent with the recommendations for the current standard for stationary applications. Electrochemical diagnostics were carried out after operating periods of 120 hours.

Diagnostics During Operation:

Electrochemical Characterization

In order to study the change in overall performance, electrochemical diagnostics were thus carried out after operating periods of 120 hours. Polarization curves were thus produced with both pure hydrogen and reformed fuel having the same composition as for the ageing tests (10 ppm of carbon monoxide) in order to study the performance losses linked to the degradation both of the anode and of the cathode. Cyclic voltammetry and electrochemical impedance spectroscopy (EIS in acronym form) were used to evaluate the respective changes in the electrochemical active surface area of the anode and of the cathode, as well as the resistances of the membrane/electrode assembly linked to ageing. The EIS measurements were carried out on cells and at the level of the stack under the same operating conditions as the polarization curves. Cyclic voltammetry curves were recorded at a temperature of 60° C., fuel and oxidizer inlet pressures of 1.5 bar, and a relative humidity of 50% for the fuel and the oxidizer, for five different cells, in order to guarantee a certain repeatability of the measurements performed for the various cells at the end of the ageing test.

In-Service Diagnostics Using a Segmented Measuring Olate:

The in-service diagnostics consist in measuring the current density and temperature distributions over the entire surface area of the fuel cell stack. The measurements were carried out using a printed circuit board (such as the current measuring device distributed under the trade name S++). The printed circuit board is located in the middle of the stack between cells 4 and 5 of the stack of 8 cells, in contact with the anode sheet and the cathode sheet of two adjacent cells. The printed circuit board is matched to the geometry of the fuel cell, so as to cover the entire surface area of the membrane/electrode assembly. With the bipolar plate design being studied, the current is measured over an array of 480 segments (20 by 24 segments) with a unit surface area of 0.49 cm$^2$, with a resolution of 0.01 A/cm$^2$. The raw data obtained by mapping were further processed before being analyzed in order to adjust the measurement of each segment to the effective area of the electrical contact between the device and the plate ribs using a methodology developed for the same design as bipolar plates. This procedure gives access to the current density distribution map (denoted CDDM hereinafter) during the entire test.

Specific Diagnostics for Carbon Monoxide Poisoning:

The effect of carbon monoxide poisoning on performance is estimated in the usual way from polarization curves obtained with various fuel qualities when the stack is operating with pure hydrogen or with reformed hydrogen. Recording the CDDM map with the segmented printed circuit board makes it possible to identify the impact of the fuel type on heterogeneities. With reformed fuel, the relative activity of the membrane/electrode assembly is lower at the zone of superposition of the air inlet and the fuel outlet, in comparison with the initial current distribution with pure hydrogen. This change in current distribution is attributed to a greater impact of carbon monoxide due to the lower partial hydrogen pressure in this zone. The evolution of the CDDM during the transition between pure dihydrogen and fuel polluted with carbon monoxide may also be used to analyze the contamination process and its impact on local performance. The slow kinetics of the poisoning phenomenon make it possible to record CDDM maps with a sufficient resolution throughout the contamination process, which lasts at least several tens of minutes. In the case of ageing with reformed fuel, the evolution of the CDDM map during the transitions between pure dihydrogen and reformed fuel is used to track the impact of ageing on the behavior of the membrane/electrode assembly and to determine how the local tolerance is affected.

Figure 6:
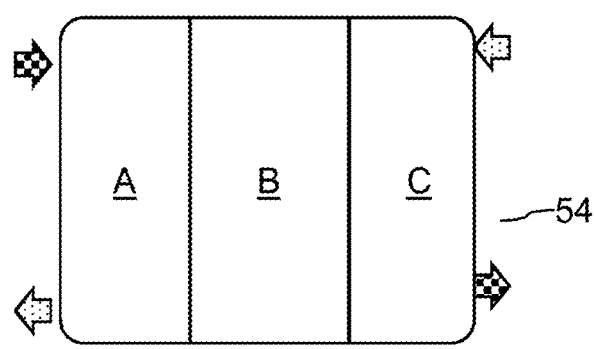
FIG. 6 illustrates three separate zones of the membrane/electrode assembly, the operation of which is studied.

A poisoning test was thus proposed as specific degradation diagnostic tool. This test implements a fixed-current transition between pure dihydrogen and reformed fuel with a fixed amount of carbon monoxide that was applied before and after each ageing period. During this test, the potential of the cell drops and the current density is redistributed over the surface area of the cell. Contamination is considered to be complete when the cell voltages are stabilized. The redistribution of fuel is measured experimentally using the printed circuit board. Based on the design of the stack of cells and on the first CDDM maps, three regions exhibiting identical average behavior are identified: zone C superimposing the air inlet and the fuel outlet, a middle zone B, and a zone A superimposing the air outlet and the fuel inlet, as illustrated in FIG. 6. During the transitions, the local current is averaged over these three zones of interest so as to obtain quantified features of the carbon monoxide poisoning diagnostics.

Figure 7:
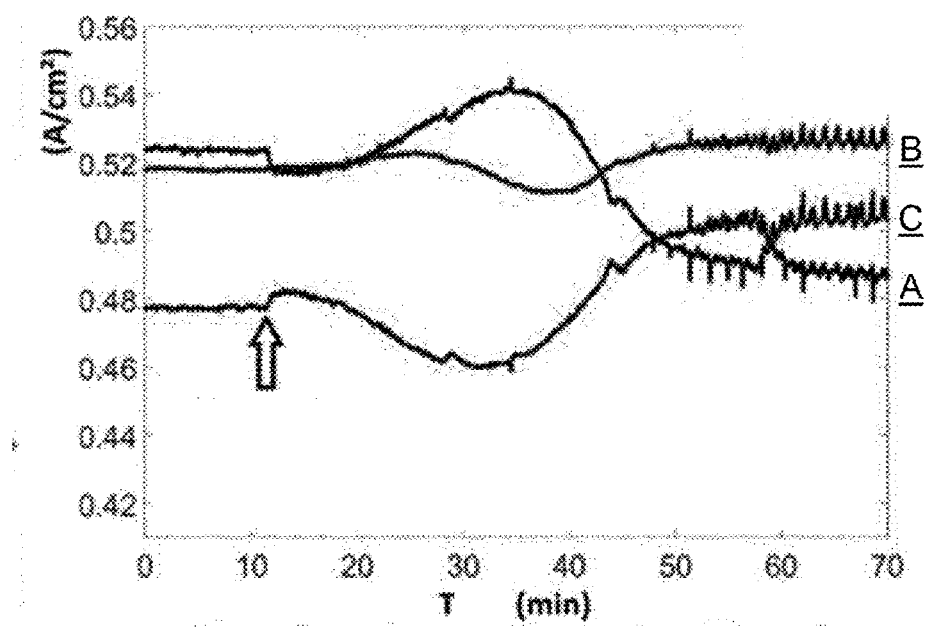
FIG. 7 illustrates the averaged current densities in the zones of FIG. 6, during an experiment with the application of a fuel including carbon monoxide.
Figure 8:
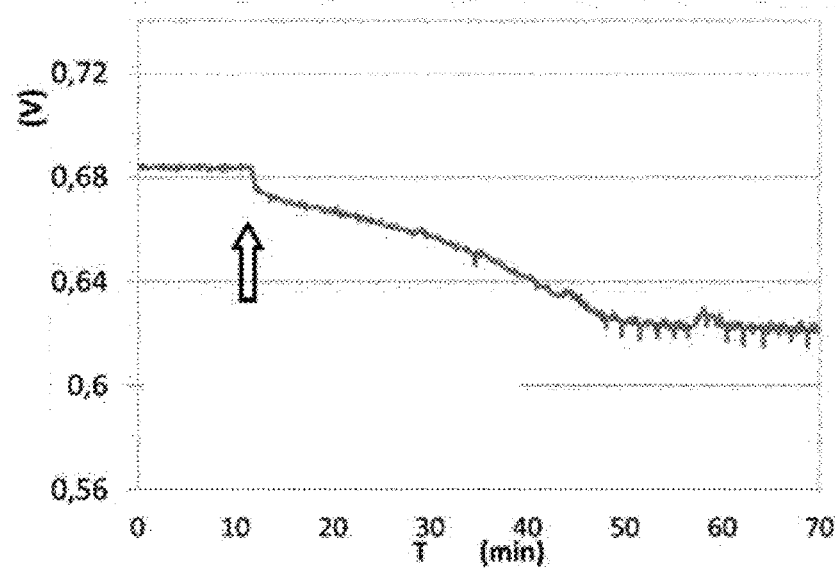
FIG. 8 illustrates the cell voltage implemented for the graphs of FIG. 7.

The typical evolution of the three zones with averaged current density is illustrated in FIG. 7 for a given transition experiment. FIG. 8 illustrates the cell voltage during the transition experiment. The first teaching is that, at the start of the experiment, that is to say with pure dihydrogen, the averaged current density is similar in the middle zone B and in the air inlet zone A, and this average current density is lower in the air outlet zone C. This difference in average current density is attributed to the lower activity of the cathode in the air outlet zone C mainly due to a lower oxygen partial pressure. The second teaching is that, after 12 minutes, a sudden change in current densities occurs at the air outlet C and at the air inlet A (illustrated by the arrow), which corresponds to the consequence of adding carbon dioxide to the fuel, thereby making it possible to clearly identify the time at which pure dihydrogen is replaced by reformed dihydrogen. From this point onward, the current density begins to decrease at the stack from the air outlet C and the dihydrogen inlet, which corresponds to the first zone markedly affected by the contamination of the catalyst of the anode with carbon monoxide. The current density is increased slightly in a surrounding zone in order to compensate and maintain a fixed value for the overall average of the current density. The carbon monoxide contamination process continues progressively toward the fuel outlet, the relative distribution of the current densities being modified, this current density reaching a minimum at the fuel inlet C when the carbon monoxide contamination has finished for this zone and has also started for the rest of the surface area of the membrane/electrode assembly. After around 35 minutes, the current density reaches a maximum for the air inlet zone A, thereby indicating that, after having covered the middle zone B and the fuel inlet zone C, the complete contamination of the superposition of the air inlet and the fuel outlet A begins, with a local decrease in the current density in this zone, compensated by an increase in the current density in the dihydrogen inlet zone C and in the middle zone B. The stabilization of these three averaged current densities indicates that the contamination process has finished over the entire surface area of the membrane/electrode assembly. The final relative distribution of the current densities shows that the middle zone B is less affected in comparison with a relative distribution obtained for pure dihydrogen, while the superposition of the air inlet and the fuel outlet A is subjected essentially to relative losses, unlike the superposition of the air outlet and the fuel inlet C.

Post-Mortem Characterization

Post-mortem analysis of the samples after ageing was implemented in order to characterize which components of the membrane/electrode assembly have degraded, by observing the evolution of their functional properties as well as their microstructures. Since the local operating conditions are not homogeneous for the entire surface area of the membrane/electrode assembly, it is important to analyze the degradation mechanisms of the components of the membrane/electrode assembly in various zones of the surface thereof. The most relevant locations were identified from CDDM mapping at the end of ageing. The analyzed samples are located in the three main zones: air inlet, middle zone and air outlet.

Cyclic voltammetry measurements were carried out on these samples, using them in the form of small membrane/electrode assemblies of 2 $cm^2$ in a single small cell, called a single cell, in order to evaluate the electrochemical properties of the electrodes, in particular in order to facilitate the interpretation of the local in-service behavior, by determining the local electrochemical active surface area (ECSA hereafter) losses for the cathode and the anode. The cyclic voltammetry was carried out at room temperature with humidified nitrogen on the side of the electrode being studied and humidified dihydrogen on the other face, with flow rates of 500 ml/min in order to maintain homogeneous behavior and strong humidification. The voltage range used for cyclic voltammetry is between 0.1 V and 0.6 V for the anode and 0.7 V for the cathode. An explicit ECSA calculation was not carried out since $Pt_3Co$ and PtRu catalysts were used as a substitute for pure Pt, and it may be considered that the assumption of an adsorption load of 210 $\mu C/cm^2$ is valid only for pure Pt. However, relative comparisons between the coulombic electric charge calculated from the area of the dihydrogen desorption peak and the shape of the voltammograms are still perfectly valid.

Sections taken from freshly dismantled membrane/electrode assemblies at the air inlet and air outlet zones, after ageing thereof, were analyzed through transmission electron microscopy. To carry out these observations, the membrane/electrode assembly samples were coated in an epoxy resin and cut into slices with a thickness of between 70 and 90 nm.

Numerical Modeling:

A transient model of two-dimensional cells was developed in order to study the heterogeneities of a fuel cell with a large active surface area. The cell is meshed from the inlets of the channels to the outlets of the channels, and through the thickness of the membrane/electrode assembly. This model incorporates the modeling of carbon monoxide poisoning at the anode in order to study its impact on local conditions inside the cell. Since the model is transient and two-dimensional, it is able to study the evolution of the current density over the entire surface area of the cell during a carbon monoxide pollution episode.

Figure 9:
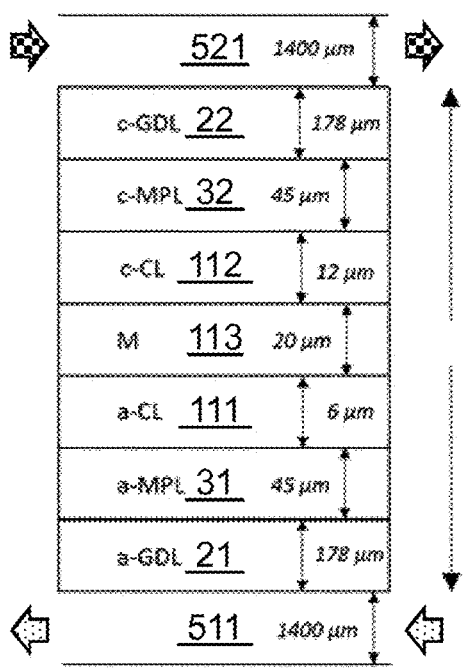
FIG. 9 is a schematic depiction of a cell model implemented for a simulation method according to another aspect of the invention.

Performance Modeling:

The geometry of the cell for the model is simplified to an equivalent of a single anode channel and a single cathode channel, thereby making it possible to study the main heterogeneities, between the inlet and the outlet, of a reagent along the channel, without leading to a numerical processing cost that would be induced by simulations based on the real geometry of the fuel cell. In this model, the effects between the channels and the walls are not taken into account. The modeling domain is based on nine different layers through the thickness, including notably the anode, the cathode gas channels, and the entire membrane/electrode assembly including the polymer electrolyte membrane, the active (or catalytic) layers, the microporous layers and the gas diffusion layers (generally called "GDL"). This model is notably illustrated schematically in FIG. 9. The various components are explicitly modeled and are connected by appropriate boundary conditions (continuity of flows and concentrations). A continuous approach was used to describe each component. Such a modeling approach, through continuity and taking into account multiple physical parameters, of two-dimensional type and including the thickness of the catalyst layer and the gas flow channels, is the basis of the approach proposed here. The modeling also innovatively takes into account the degradation mechanisms. In this model, water is taken into account either in its vapor phase or in the form of a species dissolved in the electrolyte. Liquid water is not taken into account in this model. The model is isothermal here. The respective concentrations of oxygen, dihydrogen and nitrogen are taken into account in the gas phase (in the channels and the pores) and as a species dissolved in the polymer electrolyte. The main physical phenomena will be briefly described hereinafter. The carbon monoxide poisoning mechanisms are superimposed on this performance model.

Conservation of Mass and Transport:

In the channels, gas convection is defined by the Navier-Stokes equation (momentum balance), solved with the mass balance of the total gas concentration. To take into account the gas diffusion, a mass balance is defined for each of the species except for one of them (because the overall mass balance has already been written). The Stefan-Maxwell equations are used to calculate diffusion fluxes.

In the porous supports at the anode and at the cathode, formed by the diffusion layers, the microporous layers and the catalyst layers, the mass balance is taken into account for each of the gaseous species. The diffusion and convection fluxes are calculated in a coupled manner using a modified form of the Stefan-Maxwell, Darcy and Knudsen equations, as proposed by Young and Todd ("Modelling of multicomponent gas flows in capillaries and porous solids", International Journal of Heat and Mass Transfer, vol. 48, no. 25-26, pp. 5338-5353, 2005). This approach makes it possible to achieve a mathematical interpolation between the two extreme cases, which are a gaseous diffusion that would occur exclusively in large pores (in the diffusion layer) and a Knudsen diffusion that would occur exclusively in very small pores (in the active layer). Convection is then expressed by a relationship between the pressure gradient of the gas and the sum of the fluxes of the various species, again using the approach proposed by Young and Todd.

In the active layer, the reactive gases (oxygen on the cathode side and dihydrogen on the anode side) are assumed to dissolve in the electrolyte phase, and diffuse through the ionomer layer encompassing the Pt/carbon combination (which may be likened to a very simplistic agglomerate model) before reaching the surface of the catalyst. The mass balance for the gases dissolved at the platinum surface is thus defined by including source terms linked to the consumption of the reagents and to the production of water at the catalyst surface and source terms linked to the dissolution and to the diffusion of reagent in the agglomerate. The diffusion of dissolved species through the membrane is also taken into account, thereby making it possible to estimate the permeation current.

The amount of water in the electrolyte of the catalyst layers and in the membrane is also estimated, taking into account the diffusion flux and the electroosmotic flow. The mass balance is defined considering the source terms linked to the production of water at the catalyst surface and the absorption of water in the electrolyte.

Ionic and Electric Transport:

The distribution of the ionic potential is calculated both in the membrane and in the catalyst layers, while the electric potential distribution is calculated in the active layers and in the diffusion supports (microporous layers and gas diffusion layers). The ionic and electric potentials are obtained from Ohm's law. The Springer empirical correlation (defined in the document "Polymer Electrolyte Fuel Cell Model", Journal of The Electrochemical Society, vol. 138, no. 8, pp. 2334-2342, 1991) is used to describe the dependence of ionic conductivity on the water content of the electrolyte. The source terms of the protons and electrons in the catalyst layers are linked to the electrochemical reactions by Faraday's law.

Kinetic Reactions at the Cathode:

At the catalyst surface of the cathode, the oxygen reduction reaction (denoted hereinafter using the acronym ORR) is written as follows:

$$\frac{1}{2}O_2 + 2H^+ + 2e^- \rightarrow H_2O \quad \text{Eq. 1}$$

The Butler-Volmer equation is used to link the kinetics of this reaction to the cathode overvoltage η as a function of the exchange current density $i_0$.

$$i = ai_0 \left[ \exp\left(\frac{\alpha_c nF}{RT}\eta\right) - \exp\left(\frac{-(1-\alpha_c)nF}{RT}\eta\right) \right] \quad \text{Eq. 2}$$

$$i_\theta = nFk_0 Te^{\frac{-E}{RT}} \left(\prod v_j > 0 a_j^{\gamma_j}\right)^{1-\alpha_c} \left(\prod v_j < 0 a_j^{-\gamma_i}\right)^{\alpha_c} \quad \text{Eq. 3}$$

where a is the specific platinum surface area, $\alpha_c$ is the cathode charge transfer coefficient, n is the number of electrons exchanged (equal to 2), F is Faraday's constant, R is the ideal gas constant. T is the temperature, $k_0$ and E are, respectively, the pre-exponential factor and the activation energy associated with the ORR reaction, and $a_j$ are the activity coefficients of the various reagents and products, $v_j$ are the stoichiometric factors of the various species involved in the reaction and $\gamma_j$ is the reaction order. The overvoltage is defined as the difference between the electric and ionic potentials and the equilibrium potential of the reaction, which is calculated using the Nernst equation.

Poisoning Model at the Anode:

At the anode, the hydrogen reduction reaction (called HOR for hydrogen oxidation reaction) is broken down into a plurality of reaction steps that are put in competition with the reactions linked to carbon monoxide poisoning. The carbon monoxide poisoning mechanisms at the anode were previously implemented and studied in one-dimensional models along the thickness of the membrane-electrode assemblies.

It is proposed here to take into account the absorption/desorption of carbon monoxide on the catalyst surface, the electrochemical oxidation of carbon monoxide, as well as the chemical oxidation of carbon monoxide by the oxygen present at the anode. The oxidation of carbon monoxide in the presence of oxygen provides an additional path for removing carbon monoxide from the surface of the catalyst at an increased rate. The oxygen may be present at the anode, for example due to an internal air discharge (transverse flow of oxygen through the membrane) or external air discharge (oxygen added to the anode gas flow).

Thus, to model carbon monoxide poisoning at the anode, the diffusion and convection of carbon monoxide on the anode side, as well as the oxygen coming from the cathode side through the membrane, are taken into account. The conservation equation for the concentration of carbon monoxide $C_{co}$ is taken into account in the four anode domains: the anode channels, the anode gas diffusion layer, the microporous anode layer and the anode itself. Since the amount of carbon monoxide is very low, it may be assumed that the diffusion follows Fick's law and has the average gas velocity of the other gaseous components Ug, for the convection term:

$$\epsilon \frac{\partial C_{co}}{\partial t} + \nabla \cdot (U_g C_{CO}) - \nabla \cdot (D_{CO} \nabla C_{CO}) = S_{CO} \quad \text{Eq. 4}$$

Where ε is the porosity of the support (equal to 1 in the flow channel), $D_{CO}$ is the gas diffusion coefficient of carbon monoxide in the gas mixture and $S_{CO}$ is the source term associated with the absorption of carbon monoxide on the catalyst:

$$S_{CO} = aq_{CO,ads} \quad \text{Eq. 5}$$

where a is the specific platinum surface area and $q_{CO,ads}$ is the reaction rate at the surface, the expression of which will be described hereinafter. This source term is non-zero only in the anode catalyst layer. In the catalyst layer, carbon monoxide is dissolved in the electrolyte phase before reaching the surface of the catalyst, and the dissolution concentration at equilibrium, $C_{CO,e}$, is assumed to follow Henry's law:

$$C_{CO,e} = H_{CO} C_{CO} \quad \text{Eq. 6}$$

With regard to the boundary conditions for the carbon monoxide concentration conservation equation, the concentration is imposed at the inlet of the anode channel based on the carbon monoxide content of the gas at the inlet. The flow of carbon monoxide is zero at the walls of the gas diffusion layer, of the microporous layer and of the catalyst layer. It is also assumed that this flow is negligible at the catalyst layer at the interface with the membrane.

By applying the teaching provided in the documents:

"Model for Polymer Electrolyte Fuel Cell Operation on Reformate Feed: Effects of CO, H2 Dilution, and High Fuel Utilization," J. Electrochem. Soc, vol. 148, no. 1, pp. A11-A23, 2001;

"Modelling CO poisoning and O2 bleeding in a PEM fuel cell anode," by J. J. Baschuk and X. Li, Int. J. Energy Res., vol. 27, pp. 1095-1116, 2003; and "A transient PEMFC model with CO poisoning and mitigation by O2 bleeding and Ru-containing catalyst," A. A. Shah, P. C. Sui, G.-S. Kim, and S. Ye, J. Power Sources, vol. 166, pp. 1-21, 2007;

it may be noted that the competition between the following 7 reactions should be taken into account at the anode:

absorption of $H_2$ at the anode $$H_2 + 2Pt \leftrightarrows (Pt-H) \qquad \text{Eq. 7}$$

electro-oxidation of $H_2$ at the anode $$2(Pt-H) \leftrightarrows 2H^+ + 2e^- + 2Pt \qquad \text{Eq. 8}$$

absorption of carbon monoxide (and desorption) at the anode (decrease in available platinum sites)

$$Pt + CO \leftrightarrows (Pt-CO) \qquad \text{Eq. 9}$$

electrochemical oxidation of carbon monoxide at the anode (increase in available platinum sites)

$$(Pt-CO) + H_2O \leftrightarrows Pt + CO_2 + 2H^+ + 2e^- \qquad \text{Eq. 10}$$

chemical oxidation of carbon monoxide at the anode from the transverse flow of oxygen, and the internal air discharge (increase in available platinum sites)

$$2Pt + O_2 \leftrightarrows 2(Pt-O) \qquad \text{Eq. 11}$$

$$(Pt-CO) + (Pt-O) \to 2Pt + CO_2 \qquad \text{Eq. 12}$$

$$(Pt-O) + 2(Pt-H) \to H_2O + 3Pt \qquad \text{Eq. 13}$$

It is then possible to write equilibrium equations for the evolution of the ratio of coverage of the sites by oxygen, $\theta_O$, by hydrogen, $\theta_H$, and by carbon monoxide, $\theta_{CO}$, which depends on the kinetics of the abovementioned reactions, as follows:

$$\rho \frac{d\theta_O}{dt} = 2q_{O,ads} - q_{O-H,ox} - q_{CO-O,ox} \qquad \text{Eq. 14}$$

$$\rho \frac{d\theta_H}{dt} = 2q_{H,ads} - q_{O-H,ox} - 2q_{H,ox} \qquad \text{Eq. 15}$$

$$\rho \frac{d\theta_{CO}}{dt} = 2q_{CO,ads} - q_{CO,ox} - q_{CO-O,ox} \qquad \text{Eq. 16}$$

where $\rho$ is the molar surface density of the platinum sites on the surface of the catalyst. The proportion of free platinum sites is then deduced from the following equation:

$$\theta_{Pt} = 1 - \theta_H - \theta_O - \theta_{CO} \qquad \text{Eq. 17}$$

with regard to the kinetics of the reactions, based on the document published by Shah et al., "A transient PEMFC model with CO poisoning and mitigation by O2 bleeding and Ru-containing catalyst", J. Power Sources, vol. 166, pp. 1-21, 2007, dissociated adsorption and desorption are assumed for the $H_2$ and the $O_2$, the dissociated absorption and desorption being based on Langmuir isotherms:

$$q_{H,ads} = k_{H,ads} C_{H,e} \theta_{Pt}^2 - b_{H,ads} k_{H,ads} \theta_H^2 \qquad \text{Eq. 18}$$

$$q_{O,ads} = k_{O,ads} C_{O,e} \theta_{Pt}^2 - b_{O,ads} k_{O,ads} \theta_O^2 \qquad \text{Eq. 19}$$

Butler-Volmer kinetics for the electro-oxidation of the $H_2$ and the CO are expressed as follows:

$$q_{H,ox} = k_{H,ox} \theta_H^{2\alpha} \left( e^{\alpha F \eta / RT} - e^{-(1-\alpha) F \eta / RT} \right) \qquad \text{Eq. 20}$$

$$q_{CO,ox} = k_{CO,ox} \theta_{CO} \alpha_{H_2O} \sinh(F\eta / RT) \qquad \text{Eq. 21}$$

Frumkin's Isotherms for adsorption and desorption of carbon monoxide define:

$$q_{CO,ads} = k_{CO,ads} C_{CO,e} \theta_{Pt} e^{-\beta r \theta_{CO}/RT} - b_{CO,ads} k_{CO,ads} \theta_{CO} e^{(1-\beta) r \theta_{CO}/RT} \qquad \text{Eq. 22}$$

where $C_{CO,e}$ is the concentration of carbon monoxide. The other chemical oxidation reactions are assumed to follow the laws of first-order reactions:

$$q_{O-H,ox} = k_{O-H,ox} \theta_O \theta_H^2 \qquad \text{Eq. 23}$$

$$q_{CO-O,ox} = k_{CO-O,ox} \theta_{CO} \theta_O \qquad \text{Eq. 24}$$

the time constants are assumed to follow Arrhenius' law:

$$k_i = k_{i,0} e^{-E_i/RT}; \quad b_i = b_{i,0} e^{-E_{i,b}/RT} \qquad \text{Eq. 25}$$

the pre-exponential factors $k_{i,0}$ and $b_{i,0}$ and the activation energies $E_i$ and $E_{i,b}$ proposed by Shah et al were implemented, but some of them were adjusted to better account for the experimentally observed effects of transient two-dimensional poisoning. The values of these pre-exponential factors are listed in table 1.

The molar surface density of the platinum sites on the surface of the catalyst, $\rho$, listed in table 1, is estimated using the following relationship:

$$\rho = \frac{1}{\mathcal{N} s_0} \qquad \text{Eq. 26}$$

where $\mathcal{N}$ is the Avogadro's number and $s_0$ is the surface area of a Pt reaction site, which is estimated from the distance between two-platinum atoms $d_{Pt}$:

$$s_0 = \frac{\sqrt{3}}{2} d_{Pt}^2 \qquad \text{Eq. 27}$$

The originality of the present approach is based on both the transient and two-dimensional aspect of the poisoning model, which makes it possible to study the heterogeneities along the channels of the fuel cell, in particular the distribution of the current density during pollution phases.

TABLE 1 value of the various physical parameters associated with the carbon monoxide poisoning model used in the simulations.

| | | |
|---|---|---|
| adsorption of $H_2$ | $k_{H,ads,0} = 3$ m s$^{-1}$ | $E_{H,ads} = 10.4$ kJ mol$^{-1}$ |
| desorption of $H_2$ | $b_{H,ads,0} = 4.18 \times 10^{11}$ mol m$^{-3}$ | $E_{H,ads,b} = 87.9$ kJ mol$^{-1}$ |
| electro - oxidation $H_2$ | $k_{H,ox,0} = 1$ mol m$^{-2}$ s$^{-1}$ adjusted | $E_{H,ox} = 16.7$ kJ mol$^{-1}$ |
| adsorption of $O_2$ | $k_{O,ads,0} = 6 \times 10^3$ m s$^{-1}$ adjusted | $E_{O,ads} = 14.2$ kJ mol$^{-1}$ |
| desorption of $O_2$ | $b_{O,ads,0} = 1.36 \times 10^{36}$ mol m$^{-3}$ | $E_{O,ads,b} = 250$ kJ mol$^{-1}$ |
| adsorption of CO | $k_{CO,ads,0} = 3 \times 10^8$ m s$^{-1}$ adjusted $r = 39.77$ kJ mol$^{-1}$ $\beta = 0.1$ $H_{CO} = 0.32$ | $E_{CO,ads} = 47.3$ kJ mol$^{-1}$ |
| desorption of CO | $b_{CO,ads,0} = 11.5 \times 10^3$ m s$^{-1}$ adjusted | $E_{CO,ads,b} = 100$ kJ mol$^{-1}$ |
| electro - oxidation CO | $k_{CO,ox,0} = 3.4 \times 10^9$ mol m$^{-2}$ s$^{-1}$ | $E_{CO,ox} = 127$ kJ mol$^{-1}$ |
| Oxidation H—O | $k_{O-H,ox,0} = 3.28 \times 10^4$ mol m$^{-2}$ s$^{-1}$ | $E_{O-H,ox} = 65.9$ kJ mol$^{-1}$ |
| Oxidation CO—O | $k_{CO-O,ox,0} = 8.3 \times 10^7$ mol m$^{-2}$ s$^{-1}$ | $E_{CO-O,ox} = 90$ kJ mol$^{-1}$ |
| Surface molar density of platinum sites on the surface of the catalyst | $\rho = 4.8 \times 10^{-5}$ mol m$^{-2}$ Eqs. (26)-(27) | |

The developed model was resolved using the finite element method, with a triangular mesh of approximately 6500 elements using Lagrange quadratic functions. In order to take into account the large aspect ratio between height and length of the cell, the equations are scaled in the direction of the channels in order to guarantee a good mesh quality. The processing time observed for transient analysis is around 48 hours on a computer equipped with 8 cores.

Figure 10:
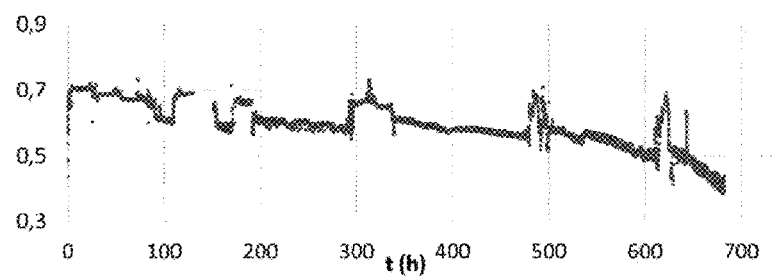
FIG. 10 illustrates a curve of cell voltage as a function of time for one example of a cell from the prior art.

Results and Conclusions:

In-Service Diagnostics:

Overall observations: the constant-current service life test was implemented with a lengthy initial period (200 hours) of operation with reformed fuel in order to evaluate its tolerance. Next, four periods were implemented with a fixed current for a duration of approximately 120 h. The test was finally interrupted after 750 hours, due to the significant degradation in performance during the last ageing period. In previous studies with identical stack designs and pure dihydrogen, with similar initial performance and a degradation rate of around 18 μV/h at constant current, such degradation was not envisaged, nor was such an acceleration in the performance degradation after 600 hours. Tests conducted on single cells on the same type of membrane/electrode assembly showed similar results, although with less significant degradation for a similar duration. In the single cell test, a constant increase in degradation was also observed with the same order of magnitude as for a high current density. The average voltage degradation rates during the ageing periods are high and always Increase, here respectively by 200, 330, 720 and 1000 μV/h during the first to fourth periods, as may be seen in FIG. 10.

Figure 11:
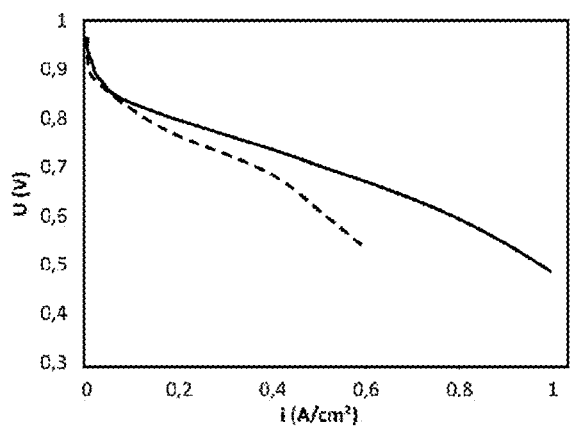
FIGS. 11 and 12 are polarization curves before and after ageing, as a function of the type of fuel that is used.
Figure 12:
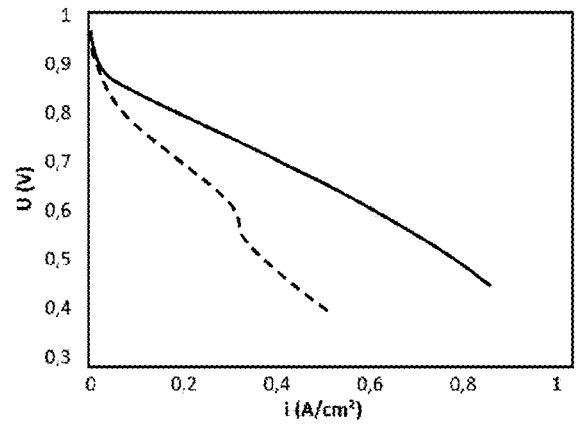

The polarization curves recorded after each ageing period under both pure hydrogen and reformed fuel were measured. The polarization curves before (unbroken line) and at the end (broken line) of ageing are shown in FIGS. 11 and 12, for operation under pure hydrogen and under reformed fuel, respectively. An accelerating initial performance drop may be observed for both types of fuel, although the drop is more pronounced with reformed fuel (with respective amplitudes of −125 μV/h and −330 μV/h for a current density of 0.5 A/cm$^2$). As may be seen from the curve of voltage as a function of time in FIG. 10, the last ageing period induces a strong decrease, which is also clearly visible on the last polarization curves for both types of fuel.

Electrochemical diagnostics were carried out through cyclic voltammetry and through electrochemical impedance spectroscopy (denoted EIS). For the anode side, only the test start and end voltammetry are available. Their comparison clearly shows a modification in the structure of the anode catalyst, with additional peaks attributed to the surface of the catalyst containing less ruthenium than at the start, which is potentially due to a reconstruction mechanism. The total average desorption load loss is around 20% for the total surface area of the anodes. On the cathode side, the modifications linked to ageing are less obvious, but the evolution of the peaks tends to exhibit cobalt losses with a voltammetry shape evolving from that of Pt$_3$Co to that of Pt. By comparing only the beginning and the end of the test, the cathodes have lost on average less than 10% of their initial active surface area. The EIS measurements confirmed the results of the polarization and cyclic voltammetry curves, showing that the charge transfer and transport resistances are affected for both fuels but that, at the end of the test, the limitations are greatly increased in the case of reformed fuel.

Evolution of Heterogeneities During Ageing:

In addition to these in-service electrochemical diagnostics giving averaged information regarding the degradation of the membrane/electrode assembly, the current density distribution maps are analyzed in order to study the effect of ageing on heterogeneities in local activities. The CDDMs were recorded with pure hydrogen and with reformed fuel, during ageing and at various current densities during the generation of the polarization curves produced between each step of the service life test. The selected results (FIGS. 13 to 18) show the CDDMs recorded at 0.5 A/cm$^2$ during the generation of the polarization curves, for three ageing levels (before ageing, after 600 hours of ageing and at the end of the test), under pure hydrogen (FIGS. 13 to 15) and under reformed fuel (FIGS. 16 to 18) including 10 ppm of carbon monoxide.

The distribution of the current density along the surface of the membrane/electrode assembly is induced by local conditions, in particular the position of the fuel and air inlets/outlets, as well as the design of the bipolar plate. This current density distribution is affected by the presence of carbon monoxide, as may be seen by comparing the maps obtained under pure hydrogen or under reformed fuel including carbon monoxide. At the start of the test, under pure hydrogen, the current density is lower in the air outlet zone, this being attributed to lower cathode activity, mainly caused by a lower partial oxygen pressure. The current density distribution is different in the case of reformed fuel, with a clear shift between the air inlet and the air outlet, indicating lower anode activity at the outlet. This modification of the current distribution is attributed to the higher influence of carbon monoxide, caused by the partial hydrogen pressure, which is lower in this region.

The current density distribution evolves during the ageing test due to local degradations. The data clearly show that the trend is different under pure hydrogen and under reformed fuel. The main observation under hydrogen is a progressive and sharp decrease in operation close to the air outlet (hydrogen inlet). This behavior is attributed to a decrease in the activity of the cathode at the air outlet, ending with very poor operation at the end of ageing. The average current density drops below 0.4 A/cm$^2$ for more than a third of the surface of the cell on the fuel inlet side. This trend is probably caused by a stronger impact of the low partial oxygen pressure in this zone, in comparison with its impact before ageing. This would be consistent with a catalytic cathode layer that is sufficiently locally degraded to exhibit much lower activity with respect to the oxygen reduction reaction after ageing.

Under reformed fuel, the trend for progressive reduction in current densities close to the air outlet is also clearly visible, but to a lesser extent in comparison with pure hydrogen. The maximum current density is located in the middle region rather than close to the air inlet. In this case, there is only a slight relative increase in the current densities at the air inlet or at the hydrogen outlet. Under reformed fuel, this effect linked to the evolution of the cathode-side operation is moderate, which would not be the case if the anode side were not to have any impact on the basis of relatively low or homogeneous degradation. It appears that, under reformed fuel, with these ageing conditions, the degradation heterogeneities are not controlled only by the cathode side. In particular, the low activity losses close to the air inlet under reformed fuel are attributed to the probable reverse impact on the anode side, where the carbon monoxide tolerance could tend to decrease in this fuel outlet zone during ageing.

Figure 21:
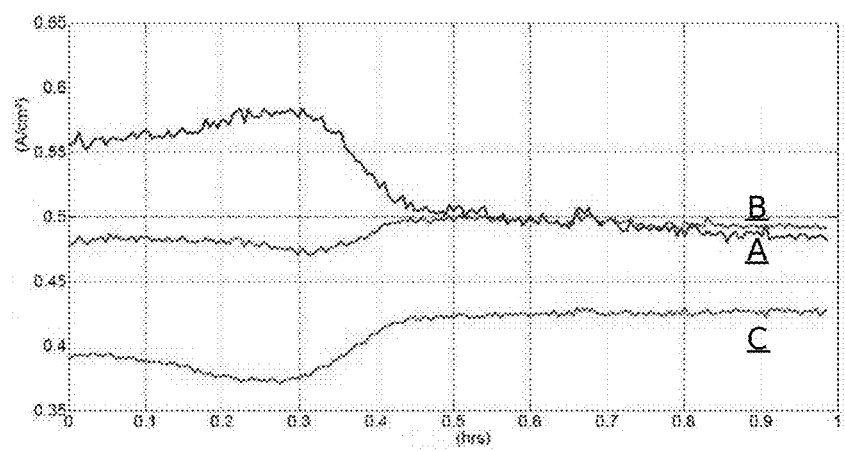

The heterogeneities of the current density during ageing are affected, but differently depending on the use of pure hydrogen or reformed hydrogen. To obtain more information regarding the local activity of the two electrodes, the results from the specific carbon monoxide poisoning test are analyzed. First of all, the average evolution of the fuel cell voltage shows that the transition is faster and that the voltage losses are greater with ageing. In addition, during the transitions, the local average current density is recorded for the three zones of interest. Before ageing, the three average current density profiles are similar (FIG. 19). At the start of ageing, that is to say after the first ageing step, the small initial differences begin to increase even under pure hydrogen (before the transition) with a high relative decrease in the current density profile at the air outlet (FIG. 20). This first negative impact of the ageing is attributed to the initial degradation of the cathode catalyst and will increase over time. Considering the current density profiles, the ageing greatly increases the deviation between the currents under pure hydrogen and under reformed fuel, in particular for the inlet/outlet zones. Under pure hydrogen (start of the transition), the standard deviation between the three zones, normalized by the average current density, changes from 2.3% at the start of the test to 8.8% after the first ageing step, so as to reach more than 16% at the end of the test (FIG. 21). The other impact of ageing on these features is the shift between the minimum and maximum current densities over time. For example, the current density peak for the air inlet zone is reached after 0.5 hours before ageing and after only 0.3 hours after ageing. This faster evolution shows that ageing accelerates the contamination process by carbon monoxide from the H$_2$ inlet to the outlet, indicating an overall decrease in the tolerance of the anode electrode.

Heterogeneity Analysis with the Simulation Tool

The transient two-dimensional model of the fuel cell was used to study the heterogeneities inside the cell under pure hydrogen and under reformed fuel. The aim is to have access to local physical quantities inside the cell that are not able to be measured during operation, such as local potentials or the concentration of gaseous species, in order to better distinguish between the various degradation phenomena.

Since the model is based on a large number of physical parameters, validation work was performed by comparing the results of the simulation with experimental data. Before considering the poisoning effect, the model was validated under pure H$_2$ by simulating a polarization curve in order to optimize the various physical parameters of the membrane/electrode assembly of the model.

Figure 22:
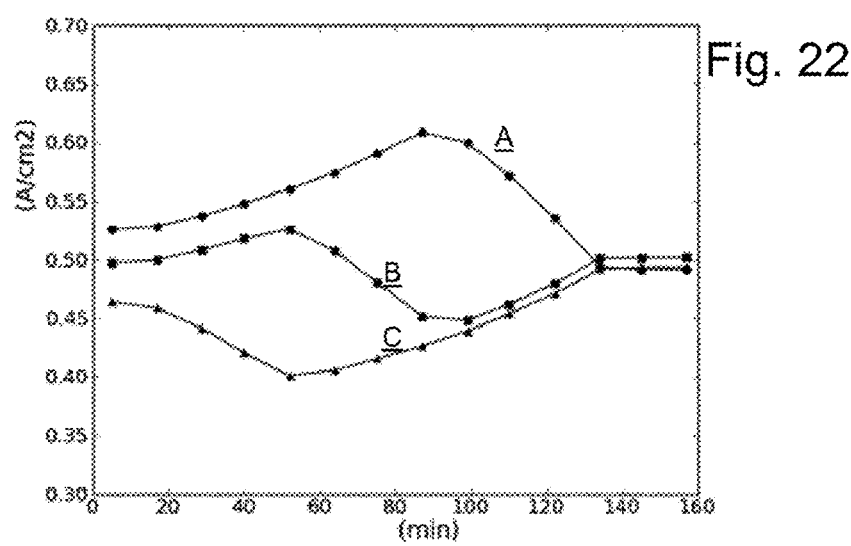
FIG. 22 is a graph of current density obtained by using a carbon monoxide poisoning simulation.

To validate the carbon monoxide poisoning model, the specific experimental poisoning diagnostics were simulated with the two-dimensional transient model, and the adjusted physical parameters are reported in table 1. In the simulation, carbon monoxide poisoning is started after 10 min of simulation by switching the supply of carbon monoxide from a concentration of 0 to 10 ppm. The obtained current densities were averaged over the three zones defined in this study (air inlet/middle zone/air outlet) for comparison with the experimental data. As may be seen by comparing FIG. 22 and FIG. 7, the transient behavior is reproduced well in terms of quality by the developed modelling. The model shows a slower transition (130 min) than the experimental one (around 50 min), which could be linked to an overestimation of the electrochemically active catalytic surface area. The amplitude of the current density during the transition is also higher.

Since the experimental and simulated fuel cell geometries are different, the direct quantitative comparison was not performed and more emphasis was placed on analyzing the main trends of the inlet/outlet heterogeneities.

The transient two-dimensional model gives access to the local physical variables in the various components of the cell during the propagation of the carbon monoxide wave. A graph obtained using such a two-dimensional model may show the evolution of the anode and cathode potentials during these poisoning diagnostics, along the anode and cathode flow channels. Injected at the inlet of the anode, the carbon monoxide increases the anode potential in this zone, thereby leading to an increase in the cathode potential at the front of this region.

At the end of the transient phase, a higher carbon monoxide coverage is obtained at the outlet of the anode: coverage is 94% at the inlet of the anode, and 97% at the outlet of the anode. The variation in the carbon monoxide coverage from 94% at the inlet to 97% at the outlet means that only 3% of platinum surface is available for the oxidation reaction of hydrogen at the outlet of the anode, whereas twice this is available at the inlet of the anode. This ratio is consistent with the low anode kinetics observed at the fuel outlet. The greater carbon monoxide coverage at the fuel outlet is due to the lower partial hydrogen pressure in this zone, which has an impact on the competition between carbon monoxide adsorption and hydrogen adsorption on the active sites. Since the effect of carbon monoxide poisoning is higher in this region that corresponds to the inlet of the cathode, it leads to the current being redistributed from the inlet of the cathode to the outlet of the cathode in comparison with operation under pure hydrogen. This may be seen in FIG. 23, which shows the current density profiles along the channel under pure hydrogen (unbroken line) and under reformed hydrogen (broken line). The observed current distribution induced by carbon monoxide poisoning is consistent with the experimental observations of the CDDM at the start of the test shown in FIGS. 13 to 18.

Figure 23:
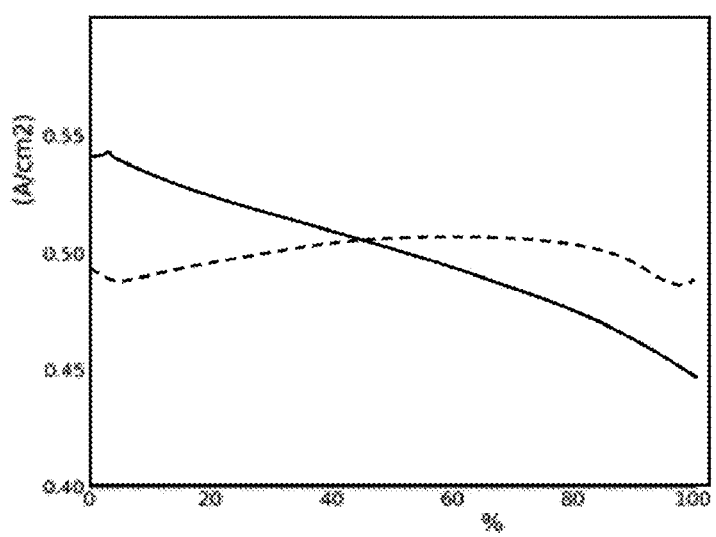
FIG. 23 is a graph showing the current density profiles along the channel as a function of the type of fuel that is used.

In a proton exchange membrane fuel cell, the local current density results from the influence of numerous local conditions: the activity of reagents and products that affect the reversible potential and the exchange current density, the ionic and electric potentials, the temperature and the electrochemically active surface area (see abovementioned Butler-Volmer equation 2). Given the strongly coupled nature of the physical phenomena involved, it is not a trivial matter to predict the impact of operating conditions on local conditions and on current densities. By virtue of the two-dimensional model, the local conditions at the origin of the observed heterogeneous current density profiles were analyzed. Under pure hydrogen, the better performance observed at the air inlet under the test operating conditions is clearly explained by the higher oxygen concentration in this zone, which has the same inlet/outlet heterogeneity as the exchange current density, while the exchange current density on the anode side is completely homogeneous and the overvoltages in the two electrodes are almost constant along the channel. Under reformed fuel, the analysis is more complex because the current density results from the local conditions of both the anode and the cathode. The higher oxygen concentration at the cathode inlet induces a higher cathode exchange current density in this zone, but this time the anode exchange current density is highly heterogeneous with a maximum on the side opposite the inlet of the anode, due to the heterogeneous carbon monoxide coverage. The overvoltages are more heterogeneous than under pure hydrogen for the two electrodes with a maximum (in terms of absolute value) at their respective outlets. These opposing trends give a current density profile under reformed fuel that is not monotonic (FIG. 23).

Figure 24:
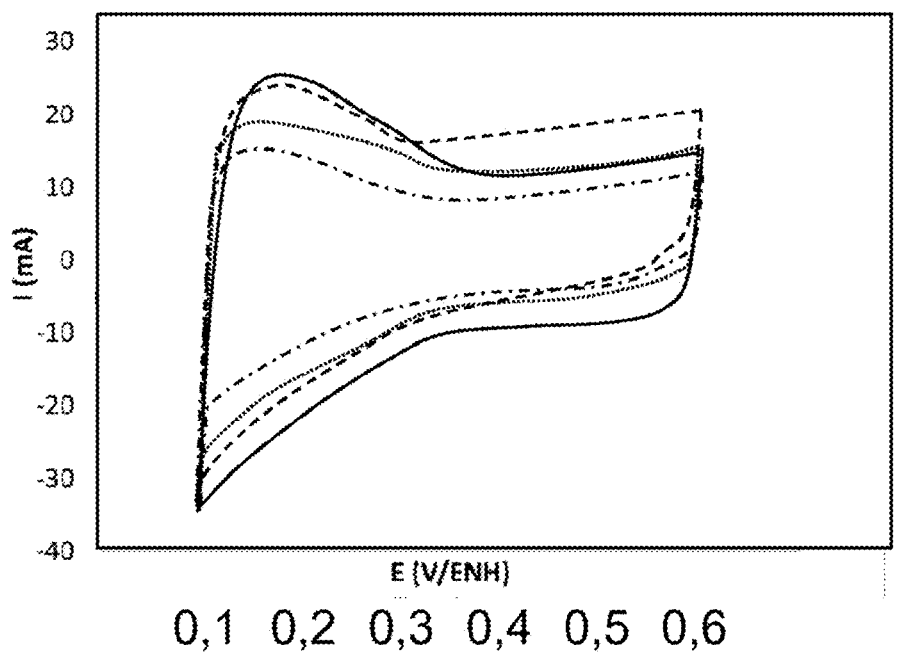
FIG. 24 illustrates voltammograms obtained using the cyclic voltammetry method as a function of the anode zones studied before and after ageing.

Post-Mortem Analysis of the Membrane/Electrode Assemblies:

Cyclic voltammetry measurements performed on selected samples of the aged membrane/electrode assemblies show that the two electrodes have a smaller active surface area at the air outlet (table 2: average coulombic electric charges). This is consistent with the local operation measured in service at the end of the test. On the cathode side, the cyclic voltammetry results after dismantling are particularly consistent with better local performance close to the air inlet under pure hydrogen, with no difference detected in the average coulombic charge between the aged cathode samples of this zone and new samples. With regard to the anode, in general, more losses are observed in comparison with the new sample, just as for the average data recorded at the level of the fuel cell. The greatest evolution for the structure of the PtRu catalyst occurred close to the hydrogen outlet, where peaks attributed to the catalytic surface area of pure Pt instead of PtRu may be observed in FIG. 24, indicating that more Ru dissolved in this fuel outlet zone. FIG. 24 illustrates cyclic voltammetry graphs. The unbroken-line curve corresponds to new anodes. The broken-line curves correspond to the middle zone of the anode. The dotted curves correspond to the air inlet zone. The dot-and-dash curves correspond to the air outlet zone. Only the dotted curve has peaks characteristic of pure platinum, appearing toward a potential beyond 0.25 V with positive and negative currents. This result confirms that the local carbon monoxide tolerance degrades over time in the fuel outlet zone.

| Hydrogen desorption coulombic charges measured on 2 cm² samples | New | Aged Air inlet/H2 outlet zone | Aged Middle Zone | Aged Air outlet/H2 inlet zone |
|---|---|---|---|---|
| Cathode | 0.044 | 0.044 | 0.030 | 0.029 |
| Anode | 0.042 | 0.028 | 0.036 | 0.022 |

In parallel, samples taken from the same membrane/electrode assembly zones as for the electrochemical measurements were analyzed, close to the air inlet and outlet, through transmission electron microscopy in an attempt to determine a correlation between the local evolution obtained in service, the evolution of electrochemical measurements in single-cell mode and the evolution of the microstructure and of the chemical composition of the components.

Microstructural Anode Analyses:

Particular attention was paid to the microstructure of the anode by studying the evolution, on the atomic scale, of the structure and of the chemical composition of the PtRu nanoparticles. This study is particularly difficult because of the small size (around 2-4 nm) of the nanoparticles and their very high heterogeneity in terms of chemical composition. For example, neighboring nanoparticles could have a composition varying between approximately fairly pure Pt and an atomic content of 30% Pt, the average atomic content of nanoparticles being around 50% Pt. Thus, the transmission electron microscopy analyses were not able to demonstrate a marked evolution of the microstructure of the PtRu nanoparticles between new and aged anodes. In particular, no Pt enrichment was able to be detected at the surface of the nanoparticles. In addition, contrary to what might be observed for membrane/electrode assemblies of the same age in highly degraded cases, Ru is not detected in the cathode or in the microporous layer of the anode. However, as observed in the membrane/electrode assembly of a similar age, the dissolution of Ru may be demonstrated by the presence of Pt—Ru precipitates in the membrane. These precipitates may result from the following mechanism. The dissolution of Ru at the anode is followed by the migration of the Ru ions toward the cathode through the membrane and then their reduction through the transverse flow of $H_2$ is catalyzed on the pre-existing bands of Pt precipitates, this band of Pt precipitates being formed by the reduction of dissolved Pt from the cathode catalyst. In the two samples (air inlet and air outlet) analyzed here, a similar band of Pt—Ru precipitates was observed in the membrane, the largest precipitates being located around 6 μm from the cathode, close to the membrane support. Although the number of precipitates appears to be similar in both samples, the size and Pt—Ru composition of the largest precipitates observed in the two samples are different. Precipitates that are around twice as large are observed in the air inlet zone (where the largest precipitate size is around 180 nm compared to around 80 nm in the outlet zone), while the atomic content of Ru in the air inlet zone (around 2%) is five times lower than in the air outlet zone (around 10%). Considering that the amount of Ru present in the Pt—Ru precipitates in the membrane is an indicator of the Ru dissolution rate of the PtRu anode catalyst, an approximate calculation taking into account the volume and composition of the largest precipitates in the membrane may be performed for both areas of the membrane/electrode assembly. This calculation indicates that around twice as much Ru is present in the largest precipitates located in the air inlet zone. The microstructural analyses of these membrane Pt—Ru precipitates are thus consistent with a higher Ru dissolution expected in the air inlet zone based on the evolution of the averaged current density profiles during the carbon monoxide poisoning diagnostics (showing a greater relative decrease in carbon monoxide tolerance) and based on electrochemical analyses on small aged samples (in particular based on the shapes of the voltammograms showing Pt-type peaks on aged anode samples at the air inlet).

Cathode Microstructural Analyses

Figure 25:
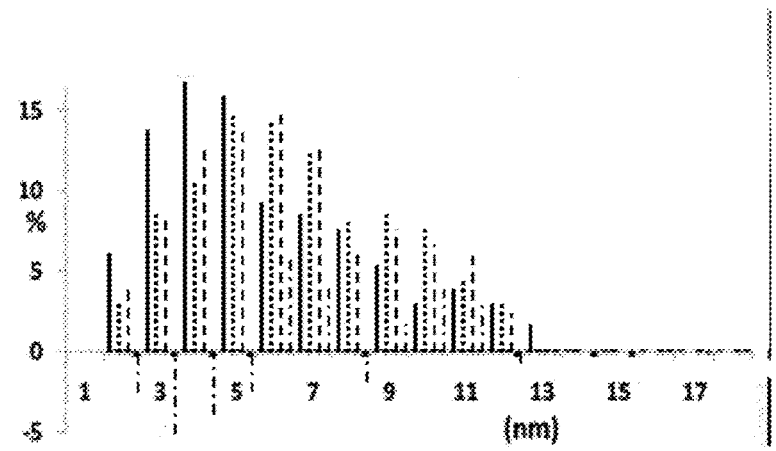
FIG. 25 is a differential histogram of sizes of cathode catalyst nanoparticles, as a function of the location on the cathode.

Similar mapping analyses were performed on the $Pt_3Co$ catalyst on the cathode side. FIG. 25 shows nanoparticle size histograms measured in new and aged membrane/electrode assemblies in the air inlet and outlet zones. Comparing these histograms reveals an increase in the size of the nanoparticles in the aged sample, with a fairly similar evolution between the air inlet and outlet zones. Given the large size distribution of the diameter of the nanoparticles, the number of 300 measured nanoparticles used to construct the histograms is probably statistically too low to demonstrate a possible difference between the two zones that could explain the difference in measured ECSA (table 2).

In addition, in order to determine the evolution of the chemical composition of the cathode, analyses were performed in the new cathodes and the two aged cathodes. No variation in the overall composition of the cathodes is observed. However, the elementary high-resolution maps for Pt and Co, produced on a few (between 5 and 10) nanoparticles in each cathode, clearly show a greater evolution in the chemical structure of the $Pt_3Co$ nanoparticles in the air outlet zone. Specifically, as shown in FIG. 25, the elementary maps for Pt and Co clearly demonstrate a Pt envelope with a thickness of 0.6 nm surrounding the core of the $Pt_3Co$ nanoparticles in the new membrane/electrode assembly.

This Pt envelope resulting from chemical leaching of Co during the nanoparticle synthesis process was probably optimized in order to prevent the production of an excessive number of Co ions in the membrane/electrode assembly during the operation of the fuel cells, the Co ions being contaminants for the ionomer of the membrane. The same analyses performed on the $Pt_3Co$ nanoparticles in the cathode air inlet zones do not reveal any significant evolution of the thickness of the Pt layer, remaining around 0.6 nm as measured on nanoparticles of a size between 8 and 18 nm. In contrast, this Pt layer surrounding the $Pt_3Co$ nanoparticles in the air outlet zone of the cathode increases significantly in terms of thickness up to 1 nm. This increase in the thickness of the Pt envelope could result from the continuous dissolution of Co during operation of the fuel cell, but more likely results from the Ostwald electrochemical ripening mechanism. Specifically, during this electrochemical process, the atoms of the smaller nanoparticles are oxidized and the ions that are produced migrate through the ionomer toward the larger nanoparticles, where they are reduced at their surface. This process is due to the standard oxidation-reduction potential which, for nanoparticles, is negatively offset with respect to the base metal, in proportion to the reciprocal radius of the nanoparticles. Charge transfer equilibrium is maintained by the parallel transfer of electrons through the carbon support. Compared to pure Pt nanoparticles, the specific feature for $Pt_3Co$ nanoparticles is that the $Co^{2+}/Co$ negative standard potential prevents reduction of cobalt ions in the membrane/electrode assembly, only Pt ions coming from the smaller nanoparticles being reduced at the surface of larger nanoparticles. Therefore, for the $Pt_3Co$ catalyst, the Ostwald electrochemical ripening mechanism leads to the dissolution of the smaller nanoparticles and to the formation of a thicker Pt layer surrounding the larger nanoparticles. This mechanism increases their size but also decreases their activity because Pt is less active than $Pt_3Co$, and this mechanism also leads to the contamination of the ionomer by the Co ions. In FIG. 25, the histogram constructed by subtracting the histogram of the new cathode from the histogram of the air outlet of the aged cathode clearly shows that, in the air outlet cathode, after ageing of the fuel cells, the number of nanoparticles decreases. Just as for pure Pt catalysts, $Pt_3Co$ nanoparticles smaller than 5 nm are not stable in the cathode when the Ostwald electrochemical ripening mechanism occurs at high amplitude. Since the dissolution of nanoparticles smaller than 5 nm results in contamination of the ionomer with Co ions, which is more damaging than with pure Pt catalysts, a robust and optimized $Pt_3Co$ catalyst should not have nanoparticles smaller than 4-5 nm.

Transmission electron microscopy analysis of aged cathodes clearly shows that the Ostwald electrochemical ripening mechanism is more widely present in the air outlet cathode zone than in the air inlet cathode zone. This difference may explain the strong loss of electrochemical performance of the cathode, recorded on the CDDM in the air outlet zone. Specifically, the Ostwald electrochemical ripening mechanism leads not only to a loss of ECSA associated with the change in the average size but also to the formation of a thicker Pt envelope surrounding the $Pt_3Co$ nanoparticles, which decreases their activity. Furthermore, this mechanism results in strong ionic contamination of the ionomer by the cobalt ions, which will decrease the proton conductivity of the ionomer. Contamination of the membrane by Co ions may be demonstrated by analysis of the membrane through X-EDS, demonstrating the presence of Co, but contamination of the ionomer located in the cathode is more difficult. This contamination was demonstrated in another study in a cathode zone where a large amount of ionomer was present. In the present study, only a small amount of Co was detected in the membrane, thereby suggesting that the Co ions provided by the dissolution of the smaller $Pt_3Co$ nanoparticles probably remain inside the cathode. This last point is supported by the overall chemical analysis of the air outlet of the cathode through X-EDS, not showing any decrease in the Co content in the cathode. In the air outlet cathode zone, the proton conductivity of the ionomer is thus probably largely affected.

Discussion

A significant and unexpected loss of performance was observed during this ageing test performed under a fixed current density of 0.5 A/cm² on a proton exchange membrane fuel cell supplied with reformed fuel. To try to understand the phenomena at the origin of such different ageing behavior between a fuel cell supplied with pure $H_2$ and the one supplied with reformed fuel, it is possible first of all to summarize the experimental observations. The voltage drop is much greater than under similar operating conditions with pure hydrogen and was reproduced on a test with a single small cell, called a single cell. In addition, acceleration of the degradation is observed. Analysis of the CDDMs under pure $H_2$ indicates a strong loss of activity at the outlet of the cathode, even though the total loss of ECSA at the cathode is not as great (less than 10%). This loss of ECSA is however greater at the outlet of the cathode and the changes in the shape of the voltammograms during ageing tend to show Co losses. Observations through transmission electron microscopy on aged samples of the inlet and outlet cathode demonstrated an Ostwald electrochemical ripening mechanism that appears to be greater at the outlet of the cathode, given the greater thickness of Pt surrounding the $Pt_3Co$ catalyst particles in this zone. This nanoparticle degradation mechanism contributes to the dissolution of Co, generating Co ions suspected of polluting the ionomer, even though direct observation of this pollution remains limited. The loss of ECSA is greater at the outlet of the cathode, but does not appear to be strong enough to explain on its own the severe loss of performance observed at the outlet of the cathode. Since the local performance depends not only on the electrochemical activity and the available surface areas of the catalysts, but also on the ionic and electronic conductivities of the electrode, the contamination of the ionomer by the Co ions is strongly suspected to be the main parameter that influenced the performance of the electrode. This contamination, which affects the transport of the protons, is notably consistent with the increase in the limitations of mass transport observed on the polarization curves during ageing both under pure hydrogen and under reformed fuel.

At the anode, the total ECSA loss is greater than at the cathode, probably due to the very small size of the PtRu nanoparticles and the general low stability of Ru, with a change in the structure of the anode catalyst from PtRu to Pt. A loss of carbon monoxide tolerance at the anode is demonstrated by virtue of the specific carbon monoxide poisoning diagnostics developed. Comparing the CDDMs as a function of ageing and between pure hydrogen and reformed fuel tends to show that this loss of carbon monoxide tolerance is greater at the outlet of the anode. This is corroborated by the local post-mortem cyclic voltammetry measurements, which indicate dissolution of Ru at the outlet of the anode (consistent with the loss of carbon monoxide tolerance), although more ECSA loss is observed at the fuel inlet. Transmission electron microscopy observations in the inlet/outlet anode regions reveal PtRu precipitates in the membrane that enhance the dissolution of Ru at the anode. Their chemical and microstructural analyses indicate that around twice as much Ru is present in the larger precipitates located at the outlet of the anode, which could confirm more severe dissolution of Ru in this region. In the outlet zone of the anode, as demonstrated by the simulation, the higher anode potential caused by carbon monoxide poisoning is probably the main cause of the dissolution of Ru with respect to the inlet zone of the anode, even despite the relatively low anode potentials observed by the simulation. Studies have specifically shown that a significant dissolution of Ru already occurs at a very low potential and increases with the anode potential.

Using the simulation tool, the local physical quantities (exchange current densities, concentrations of reagents, local potentials, etc.) in the anode and the cathode were compared for pure hydrogen and reformed fuel. These simulations dearly demonstrate that the poisoning of the anode with carbon monoxide, greater at the anode outlet, induces a redistribution of the current from the inlet of the cathode to the outlet of the cathode in comparison with operation under pure hydrogen. Therefore, the local conditions are not similar when operating under pure hydrogen or under reformed fuel. Under reformed fuel, the anode potential is higher and more heterogeneous between the inlet and the outlet, and the current density and therefore the production of water is higher at the outlet of the cathode where the cathode potential is lowest.

Given all these observations, we suspect the following accelerated degradation mode. At the anode, the high potential at the outlet of the anode due to the heterogeneous coverage by carbon monoxide promotes the dissolution of Ru in this zone, which increases the shift of the current density toward the inlet of the anode. Due to carbon monoxide poisoning in the anode outlet, the cathode has its highest current density at the air outlet, where its potential is lowest. This involves more local water in this zone, thereby promoting the Oswald electrochemical ripening degradation mechanism by improving the transport of metal ions between neighboring nanoparticles. However, for the $Pt_3Co$ catalyst, the Co ions do not redeposit, and they pollute the ionomer of the cathode at the air outlet, leading to a decrease in local ionic conductivity and to a decrease in the electrode potential, which should lead to a decrease in the local current by moving it toward the inlet. However, due to the heterogeneous carbon monoxide coverage at the anode, even enhanced by the dissolution of Ru creating the loss of carbon monoxide tolerance at the anode outlet with ageing, the local current density remains high at the outlet of the cathode. Therefore, in this configuration, the cathode is forced to work at the air outlet/fuel inlet where its potential is lowest. Lastly, since the necessary redistribution of the current from the inlet of the cathode to the outlet of the cathode becomes more difficult due to degradation of the outlet of the cathode, the overall performance loss of the proton exchange membrane fuel cell is accelerated.

Implementation of a Modified Electrode for Attenuating the Degradation

In view of the conclusions from the studies coupled by experimentation and by simulation, optimized membrane/electrode assemblies were designed, by varying the composition of the catalyst layers. Two zones were identified with major and specific degradation phenomena. On the cathode side, it was concluded that the operation of the air outlet region could be affected by contamination of the ionomer by Co ions, following the promotion of the dissolution of Co in this region. To avoid this phenomenon, it is necessary to identify a more stable catalyst regarding the dissolution of Co. The cathode catalyst layer was therefore modified close to the air outlet by replacing the bimetallic $Pt_3Co$ catalyst used initially with pure Pt, while slightly increasing the load in order to locally maintain a similar level of catalytic activity for the oxygen reduction reaction. One third of the cathode gas diffusion electrode was replaced with a cathode gas diffusion electrode with the same diffusion layer but with a catalyst (or catalytic) layer containing platinized carbon with a content of 50% Pt on carbon (instead of 45% $Pt_3Co$) with a loading of 0.55 mg Pt/cm$^2$ (instead of 0.45 mg $Pt_3Co/cm^2$).

The first third of the cathode, corresponding to the air inlet zone, and the second third of the cathode, corresponding to the middle zone, may thus have a $Pt_3Co$ catalyst with a loading of 0.45 mg/cm$^2$. The third of the cathode, corresponding to the air outlet zone, may have a Pt catalyst with a loading of 0.55 mg/cm$^2$, forming a zone having a tolerance to the dissolution of cobalt and thus to the increased pollution by Co ions in comparison with the air inlet and middle zones.

Thus, although it is counter-intuitive to use a higher cathode loading at the oxidizer outlet in comparison with the rest of the cathode, it was able to be observed that such a configuration actually made it possible to improve the operation of the fuel cell since it was made to operate more at its outlet. The invention thus makes it possible to avoid a poor current distribution with the ageing of the fuel cell.

On the anode side, it was concluded that the operation of the fuel outlet region could be affected by the higher dissolution of ruthenium due to the higher local potential, with continuously increased degradation of local carbon monoxide tolerance. To compete with the initial mechanism involved, it is necessary to identify a more stable catalyst regarding the dissolution of Ru. Since the PtRu catalyst is still the best available solution for operating under reformed fuel containing carbon monoxide, a modification was made by changing the catalyst loading. The anode catalyst layer was thus modified close to the fuel outlet by increasing the loading of bimetallic PtRu catalyst initially used in order to improve tolerance and to overcome problems linked to losses of carbon monoxide tolerance. One third of the anode gas diffusion electrode was replaced with a gas diffusion electrode having the same diffusion layer and a catalyst layer containing PtRu on carbon with a content of 50% PtRu with a load of 0.65 mg PtRu/cm$^2$ (instead of 0.45 mg PtRu/cm$^2$).

The first third of the anode, corresponding to the fuel inlet zone, and the second third of the anode, corresponding to the middle zone, may thus have a PtRu catalyst with a loading of 0.45 mg/cm$^2$. The third of the anode, corresponding to the fuel outlet zone, may have a PtRu catalyst with a loading of 0.65 mg/cm$^2$.

With such a configuration, the anode is more tolerant to carbon monoxide pollution (more constant electrode potential) and exhibits more stable operation over time.

Figure 26:
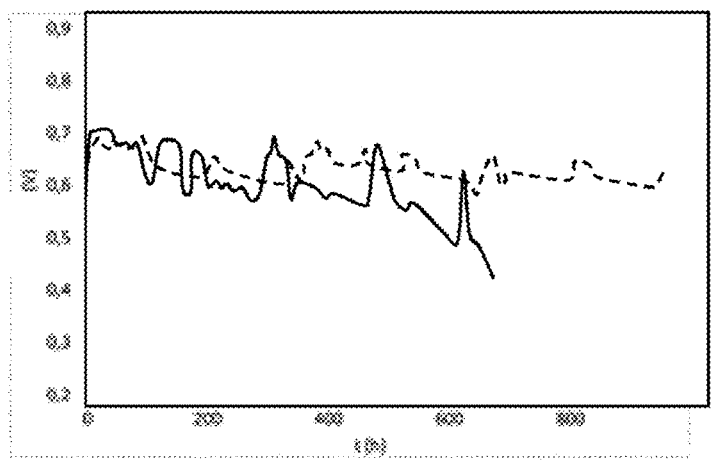
FIG. 26 is a comparative graph of the average cell voltage for a cell from the prior art and a cell according to the invention.

These membrane/electrode assemblies were tested at the fuel cell, demonstrating a marked improvement in the performance stability of the membrane/electrode assemblies without accelerating voltage losses over the 1000 hours of ageing test, as may be seen in FIG. 26 (graph comparing the average voltage for a reference electrode in an unbroken line and an electrode according to the invention in broken lines).

Figure 27:
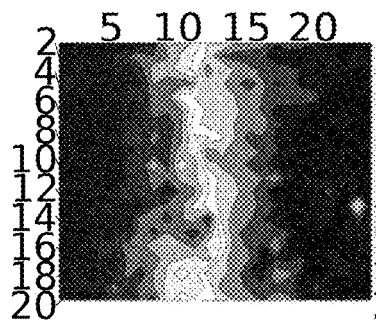
FIGS. 27 to 30 illustrate maps of the difference in current distribution before and after ageing in a cell according to the prior art and a cell according to the invention, after ageing with the various fuels that are used.
Figure 28:
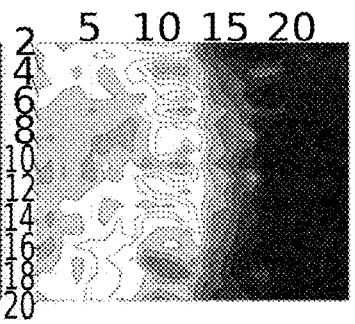

In addition to the overall measurements showing how modifying the composition of the electrodes could lead to more stable performance, their effect on changes in heterogeneity was also considered for further interpretation. The differences between before and after ageing were calculated for the CDDMs recorded under pure hydrogen and under reformed fuel, for a reference membrane/electrode assembly in FIGS. 27 and 28, on the one hand, and for a membrane/electrode assembly according to the invention in FIGS. 29 and 30, on the other hand.

For the reference membrane/electrode assemblies, the differences give the same results, but the information is clarified in comparison with the CDDMs shown in FIGS. 13 to 18. The maps in FIGS. 27 and 28 confirm the heterogeneities after ageing with strong performance losses at the cathode outlet of the two types of fuel and a strong performance gain relative to the air inlet under pure hydrogen, in contrast to a very moderate change in activity in the middle at the air inlet under reformed fuel.

Figure 29:
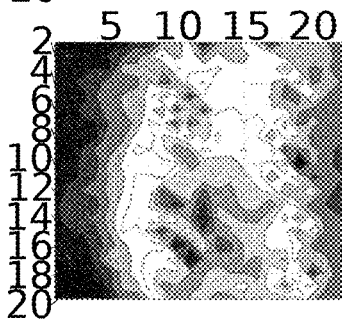
Figure 30:
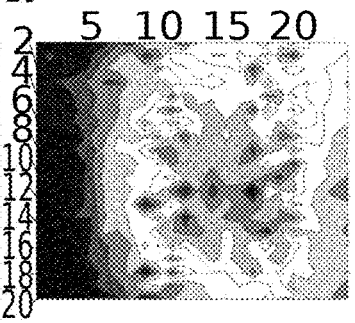

The first observation evident in the maps of FIGS. 29 and 30, recorded respectively under pure H$_2$ and under reformed fuel but with modified membrane/electrode assemblies, is the enormous difference in the evolution of the heterogeneities in comparison with the reference case. In addition, the amplitude of the current variations is similar for the two fuels. In comparison with the previous membrane/electrode assemblies, this amplitude is much lower for the case of pure hydrogen, also with an extension of the surface area covered by a positive change or without a change. The main relative losses of activity are located at the air inlet, with a more pronounced effect also extended toward the middle for the case of reformed fuel, The main difference between the uses of the two fuel cases occurs at the air outlet, with clear current losses for the case of pure hydrogen, resembling the ageing effect for the reference membrane/electrode assemblies. In comparison with the reference case, the zone of maximum increase in current densities was shifted toward the middle and air outlet zones of the cells. Considering the above conclusions regarding the link between local operation and the electrodes, modifying the cathode effectively reduced losses close to the modified zone. The beneficial effect of the novel cathode composition is greater under reformed fuel. This result shows good consistency with the phenomena suspected and described in the experimental and modeling studies regarding damage caused to the operation of the air outlet with an effect accelerating the performance losses attributed in particular to the dissolution of Co, which obviously does not occur here.

With modified membrane/electrode assemblies, the zone that is currently primarily degraded with regard to in-service operation is the air inlet. This new behavior is consistent with the previous results obtained in the ageing study conducted with pure hydrogen only and also using Pt$_3$Co, showing greater losses close to the air inlet. The proposed interpretation is linked to the impact of the anode side on the cathode side, with, in these last two cases, an anode operating with low limitations during ageing, by virtue of operation respectively with pure hydrogen or, in our case, better activity of the anode reaction with the increased loading of PtRu catalyst. In our case, higher cathode activity occurs in the air inlet zone where the partial oxygen pressure is high and the anode does not prevent the correct operation of the membrane/electrode assembly, thus subjecting the cathode catalyst to local conditions that promote degradation thereof. In contrast to what happened with homogeneous reference membrane/electrode assemblies, there are no more reasons, such as carbon monoxide poisoning, to cause the redistribution of the current density to the air outlet under reformed fuel with such intensity.

In summary, the explanation proposed for the reversal in the location of the main losses with the novel membrane/electrode assemblies is that the improvement in the anode carbon monoxide tolerance prevents protection of the cathode catalyst, the degradation of which close to the air inlet becomes the weak spot with both types of fuel. These results are therefore clearly consistent with what could be expected following the appropriate modifications to the membrane/electrode assemblies, confirming the relevance of this type of study coupling experimental in-service and post-mortem studies, and of modeling in order to understand degradation in specific cases and propose solutions to mitigate and improve durability.

CONCLUSIONS

The durability test under stationary operating conditions was studied using various different local and global experimental techniques in service. An unexpected and highly severe potential degradation was measured ranging from 200 µV/h for the first ageing phase to 1000 µV/h for the last one. In-service diagnostics under pure hydrogen show a strong decrease in the current density of the air outlet of the cathode, while the trend is less pronounced under reformed fuel due to the non-negligible impact of the degradation of the anode. These heterogeneity analyses are supported by multi-physical simulations that demonstrate the heterogeneous carbon monoxide coverage along the anode, as well as the competition between the two electrodes under reformed fuel, leading to non-monotonic current density profiles. At the end of life, electrochemical and transmission electron microscopy analyses were carried out on three characteristic zones (air inlet, middle zone and air outlet) of the membrane-electrode assembly in order to better understand the degradation mode. The combined analyses demonstrate heterogeneous degradations at the two electrodes. More ruthenium is dissolved at the outlet of the anode, while an Ostwald electrochemical ripening mechanism of the $Pt_3Co$ nanoparticles at the outlet of the cathode is suspected of polluting the ionomer with Co ions. Optimized membrane/electrode assemblies were therefore designed to mitigate these suspected degradation mechanisms by varying the composition of the catalyst (or catalytic) layer of the two electrodes and were tested in a fuel cell, thus demonstrating a marked improvement in durability.

The invention claimed is:

1. A cell configured for a fuel cell, comprising:
   a membrane-electrode assembly, comprising a proton exchange membrane, an anode electrode fixed to a first face of the proton exchange membrane, and a first flow guide plate arranged opposite the anode electrode, the first flow guide comprising a first flow channel having a fuel inlet zone, a first middle flow zone, and a fuel outlet zone; wherein
   at the fuel outlet zone, the anode electrode has a carbon monoxide pollution tolerance greater than its average carbon monoxide pollution tolerance at the middle flow zone and at the fuel inlet zone,
   the membrane-electrode assembly further comprises a cathode electrode fixed to a second face of the proton exchange membrane,
   the cell further comprises a second flow guide plate arranged opposite the cathode electrode comprising a second flow channel,
   the second flow channel comprises an oxidizer inlet zone, a second middle flow zone, and an oxidizer outlet zone,
   the cathode electrode comprises a PtX alloy catalyst, X being a metal and a proportion of the metal X in the catalyst in the oxidizer outlet zone is lower than an average proportion of the metal X in the catalyst outside the oxidizer outlet zone, and
   the metal X is cobalt.

2. The cell of claim 1, wherein the cathode electrode comprises a zone having a catalyst loading greater than its average catalyst loading outside this zone.

3. The cell of claim 2, wherein the zone of the cathode electrode having a greater catalyst loading is positioned at the oxidizer outlet zone.

4. The cell of claim 2, wherein the oxidizer outlet zone of the cathode electrode is positioned vertically to the fuel inlet zone.

5. The cell of claim 2, wherein the oxidizer inlet zone of the cathode electrode is positioned vertically to the fuel outlet zone, and
   wherein the oxidizer inlet zone of the cathode electrode has a catalyst loading lower than its average catalyst loading outside this zone.

6. The cell of claim 1, wherein the proportion of the metal X in the oxidizer outlet zone is at least two times lower than the average proportion of the metal X of the catalyst outside the oxidizer outlet zone.

7. The cell of claim 1, wherein the anode electrode has, at the fuel outlet zone, a carbon monoxide tolerance at least 30% greater than its average carbon monoxide tolerance at the middle flow zone and at the fuel inlet zone.

8. The cell of claim 1, wherein the anode electrode comprises PtRu at its outlet zone.

9. The cell of claim 1, wherein the anode electrode has, at its outlet zone, a catalyst loading greater than its average loading outside the outlet zone.

10. The cell of claim 9, wherein the anode electrode has, at its outlet zone, a catalyst loading at least 30% greater than its average loading outside the outlet zone.

11. A membrane-electrode assembly configured for implementing the fuel cell of claim 1, the assembly comprising:
    a proton exchange membrane; and
    an anode electrode fixed to a first face of the proton exchange membrane, the anode electrode having, at a zone configured to be arranged at a fuel outlet, a carbon monoxide pollution tolerance greater than its average carbon monoxide pollution tolerance at a zone configured to be arranged at a middle flow zone and at a zone intended to be arranged at a fuel inlet.

12. A method for producing an optimized membrane/electrode assembly for a fuel cell, comprising:
    simulating aging of a membrane/electrode assembly;
    applying to a two-dimensional model of the fuel cell, a first dimension corresponding to a flow direction of a reagent, a second dimension corresponding to a thickness of the cell, cathode flow being modeled by a single flow channel, anode flow being modeled by a single flow channel, the two-dimensional model being configured to determine anode poisoning based on an amount of carbon monoxide in fuel;
    using the two-dimensional model by applying it to a flow of fuel comprising carbon monoxide, so as to determine poisoning of the anode by carbon monoxide based on a position in the first dimension;
    determining an optimized composition of catalyst layers at an anode and a cathode of the membrane/electrode assembly based upon results of the simulating and the applying and using the two-dimensional model; and
    producing a membrane/electrode assembly with said optimized composition of catalyst layers at the anode and cathode.

* * * * *